(12) United States Patent
Debow

(10) Patent No.: US 8,442,909 B2
(45) Date of Patent: *May 14, 2013

(54) TRANSACTION PROCESSING ENTITY DEVICE SUPPORT OF AN INTEGRATED OFFER NETWORK

(75) Inventor: Howard Scott Debow, Piedmont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,807

(22) Filed: Apr. 3, 2012
(Under 37 CFR 1.47)

(65) Prior Publication Data

US 2012/0254020 A1    Oct. 4, 2012

Related U.S. Application Data

(63) Continuation of application No. 12/413,033, filed on Mar. 27, 2009, now Pat. No. 8,180,702.

(60) Provisional application No. 61/091,422, filed on Aug. 24, 2008.

(51) Int. Cl.
*G06Q 40/00* (2006.01)
(52) U.S. Cl.
USPC .............................................. 705/38; 705/39
(58) Field of Classification Search ............... 705/10–44
See application file for complete search history.

(56) References Cited

U.S. PATENT DOCUMENTS

| 6,154,729 | A | 11/2000 | Cannon et al. | |
|---|---|---|---|---|
| 6,332,126 | B1 | 12/2001 | Pierce et al. | |
| 6,845,906 | B2 | 1/2005 | Royer et al. | |
| 7,827,057 | B1* | 11/2010 | Walker et al. | 705/14.33 |
| 7,831,470 | B1* | 11/2010 | Walker et al. | 705/14.23 |
| 7,870,021 | B2* | 1/2011 | Mankoff | 705/14.17 |

(Continued)

FOREIGN PATENT DOCUMENTS

| EP | 1182599 | 2/2002 |
|---|---|---|
| WO | 2008083089 | 7/2008 |

OTHER PUBLICATIONS

Gray, Jim et al., "Transaction Processing: Concepts and Techniques," Morgan Kaufmann Publishers, Inc., San Mateo, CA, pp. 5-7, 1993.

(Continued)

*Primary Examiner* — Frantzy Poinvil
(74) *Attorney, Agent, or Firm* — Greenberg Traurig, LLP

(57) ABSTRACT

A method begins by generating, for each of a plurality of merchant devices, an offer data file to produce a plurality of offer data files. The method continues by: compiling, for one issuer device, an options data file for a group of credit cards based on at least one of the plurality of offer data files; transmitting the options data file to the issuer device; receiving, from the issuer device, at least one selection from the options data file to produce an options program file for the group of credit cards; receiving, from a card holder device associated with one of the group of credit cards, a selection of at least one option from the options program file to produce at least one selected option; and processing transactions of the one of the group of credit cards in accordance with the at least one selected option.

20 Claims, 26 Drawing Sheets

U.S. PATENT DOCUMENTS

| | | |
|---|---|---|
| 8,180,702 B2 | 5/2012 | Debow |
| 2002/0156723 A1 | 10/2002 | Lilly et al. |
| 2003/0126011 A1 | 7/2003 | Bryman et al. |
| 2003/0154125 A1 | 8/2003 | Mittal |
| 2004/0155101 A1 | 8/2004 | Royer et al. |
| 2005/0267812 A1 | 12/2005 | Jensen et al. |
| 2006/0053056 A1 | 3/2006 | Alspach-Goss et al. |
| 2006/0167753 A1 | 7/2006 | Teague et al. |
| 2006/0206376 A1 | 9/2006 | Gibbs et al. |
| 2007/0162337 A1 | 7/2007 | Hawkins et al. |
| 2007/0162377 A1 | 7/2007 | Williams |
| 2008/0082415 A1 | 4/2008 | Shastry |
| 2008/0154727 A1 | 6/2008 | Carlson |
| 2008/0249813 A1 | 10/2008 | Schmeyer |
| 2010/0049588 A1 | 2/2010 | Debow |
| 2010/0049589 A1 | 2/2010 | Debow |
| 2010/0049620 A1 | 2/2010 | Debow |
| 2011/0093324 A1* | 4/2011 | Fordyce et al. ............ 705/14.27 |
| 2011/0264501 A1* | 10/2011 | Clyne ........................ 705/14.25 |
| 2012/0101887 A1* | 4/2012 | Harvey et al. .............. 705/14.23 |
| 2012/0215610 A1* | 8/2012 | Amaro et al. .............. 705/14.23 |

OTHER PUBLICATIONS

International Patent Application PCT/US09/54808, International Search Report & Written Opinion, Mar. 30, 2010.

International Patent Application PCT/US09/54809, International Search Report & Written Opinion, Apr. 15, 2010.

International Patent Application PCT/US09/54810, International Search Report & Written Opinion, Apr. 8, 2010.

* cited by examiner

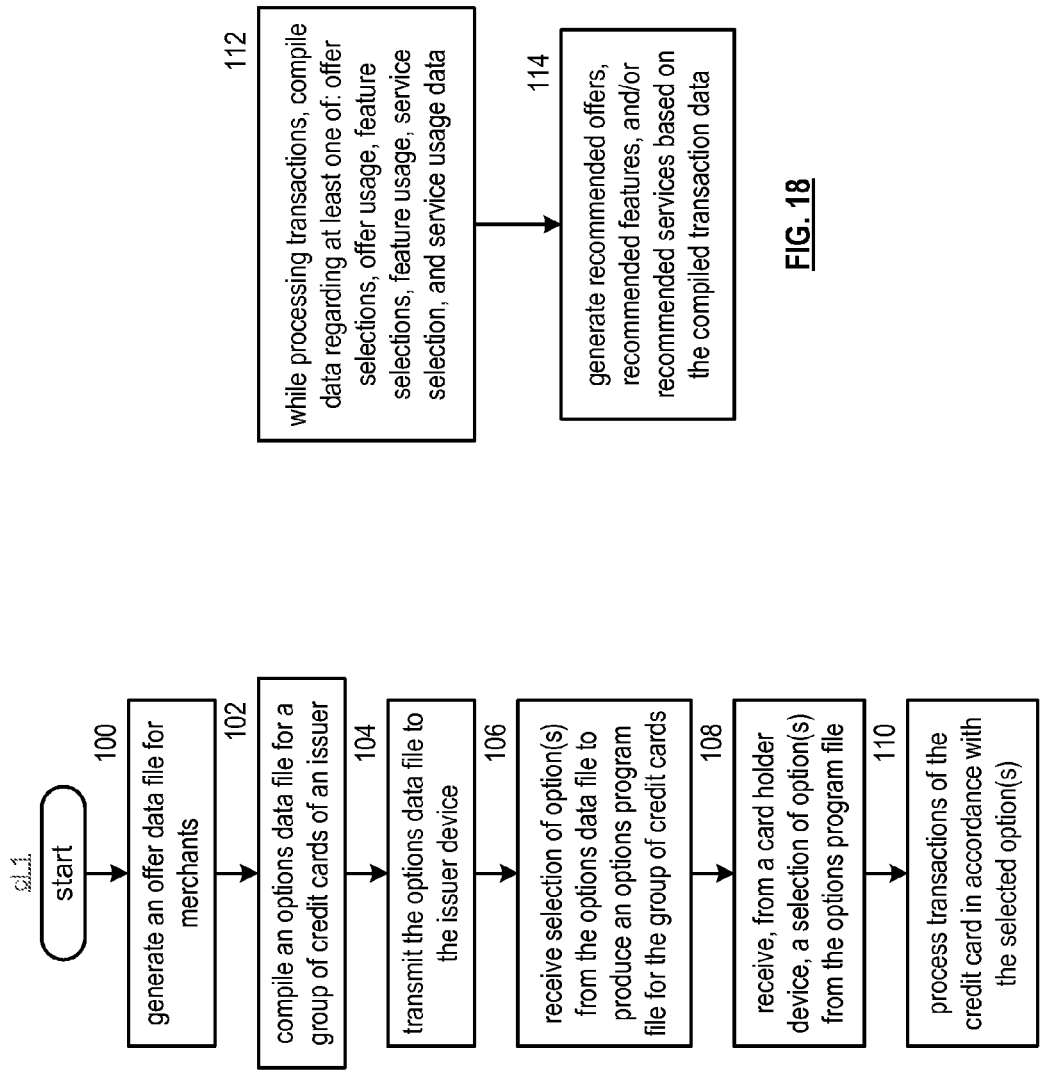

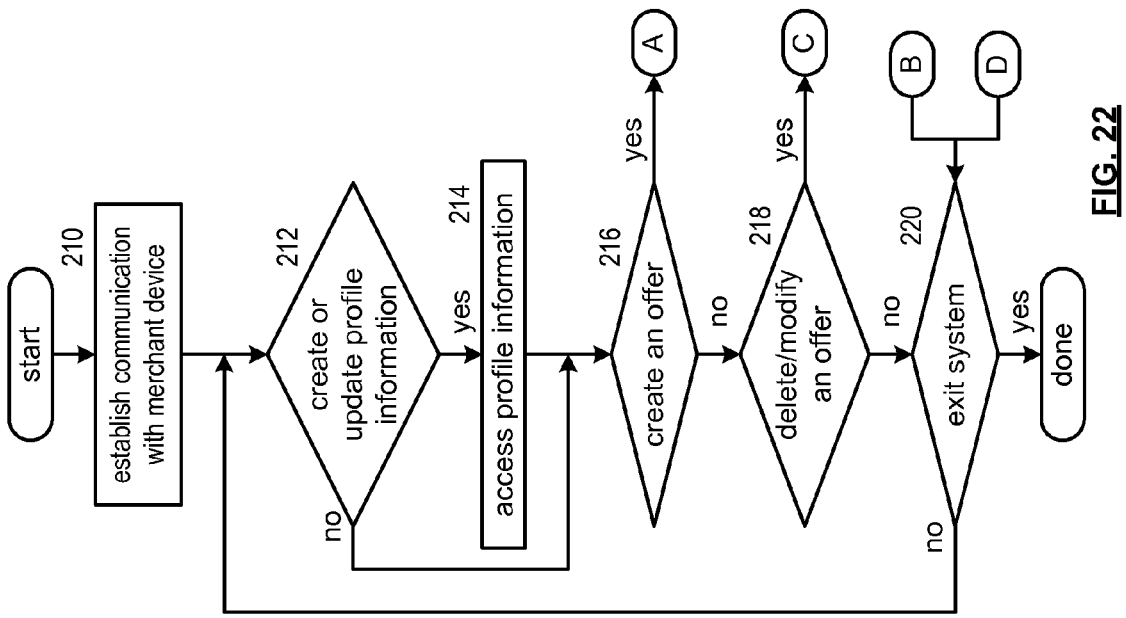

FIG. 25

List of Offers 250

| Select | Details | Generic | Location | Consumer | Issuer | CC Status |
|---|---|---|---|---|---|---|
| ☐ | 2% off all items | X | | | | |
| ☐ | 5% off Men's Shoe | | All | Male 18-30 | All | All |
| ☐ | 1 bonus point per $1 | | All | All | Bank A | Intermediate or higher |
| ☐ | buy 10 of X get 1 free | | CA, TX | All | All | All |
| ☐ | exclusive shopping | X | | | | |
| ☐ | Free shipping with purchase > $50 | | All | All | Bank B | Premium |
| | • • • | | | | | |
| ☐ | Free product Y with purchase of product Z | | Region 1 | Female Sport "A" | All | Intermediate or higher |
| | • • • | | | | | |
| ☐ | Merchandize 10% off 12/1/07 – 12/8/07 | X | | | | |

FIG. 26

Merchant A's Offers 252

| Details | Generic | Location | Consumer | Issuer | CC Status |
|---|---|---|---|---|---|
| 1 bonus point per $1 | | All | All | Bank A | Intermediate |
| Free product Y with purchase of product Z | | Region 1 | Female Sport "A" | All | Intermediate or higher |
| Merchandize 10% off 12/1/07 – 12/8/07 | X | | | | |

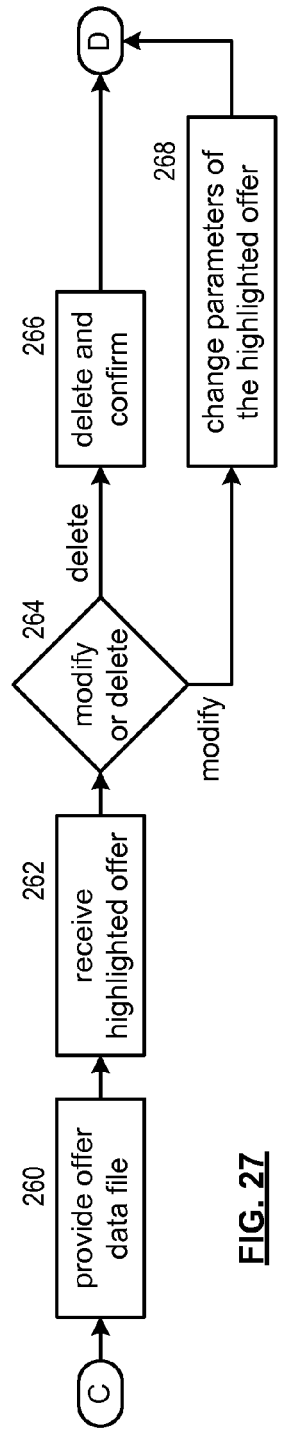

FIG. 27

| Merchant A's Offers 252-1 | | | | | | |
|---|---|---|---|---|---|---|
| Details | Generic | Location | Consumer | Issuer | CC Status |
| 1 bonus point per $1 | | All | All | Bank A | Intermediate |
| Free product Y with purchase of product Z | | Region 1 | Female Sport "A" | All | Intermediate or higher |
| Merchandize 10% off 12/1/07 – 12/8/07 | X | | | | | highlighted →

FIG. 28

| Merchant A's Offers 252-2 | | | | | | |
|---|---|---|---|---|---|---|
| Details | Generic | Location | Consumer | Issuer | CC Status |
| 1.5 bonus point per $1 | | All | All | Bank A | Intermediate |
| Free product Y with purchase of product Z | | Region 1 | Female Sport "A" | All | Intermediate or higher |
| Merchandize 10% off 12/1/07 – 12/8/07 | X | | | | | modified →

FIG. 29

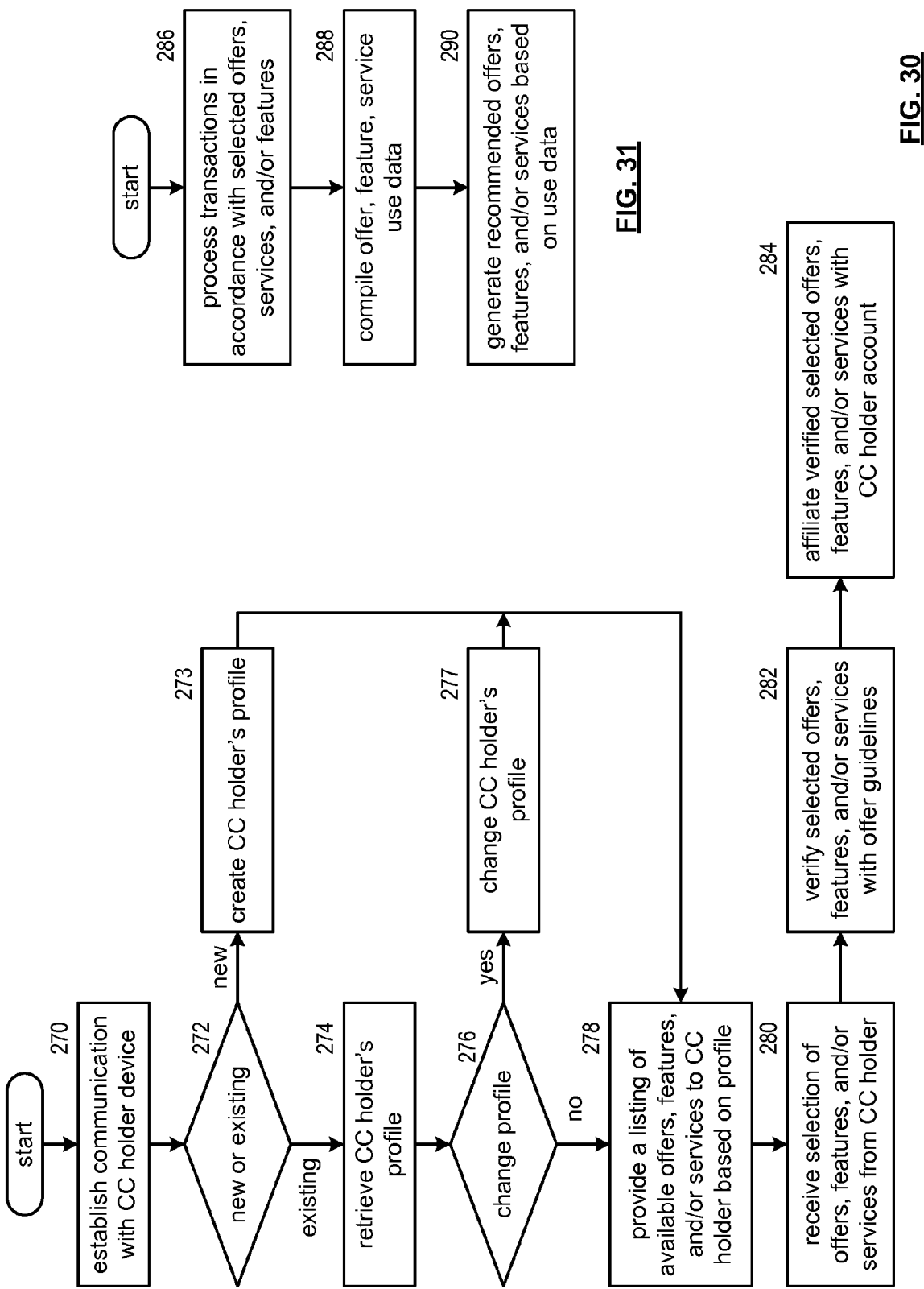

CC holder profile 300

Account Information

Name: John Q. Public
Sex: Male
Age: 36
Account #: xxxx xxxx xxxx xxxx
Account Type: Gold
Issuer: Bank ABC Location Preference:
☐ Within 20 miles of home  ☐ County  ☐ State  ☐ no preference
☐ traveling to <specify>
☐ other <specify>

Product Categories of Interest:
☐ Apparel  ☐ Shoes  ☐ Books, Music & Movies  ☐ Computers
☐ Software  ☐ Electronics  ☐ Sports  ☐ Fitness  ☐ Flowers
☐ General Retail ....
☐ Other <specify>

Service Categories of Interest:
☐ Food Service  ☐ Beverage Service  ☐ Auto Repair  ☐ Computer Repair  ☐ Consulting  ☐ Insurance ...
☐ Other <specify>

Benefit Type Preferences:
☐ Cash Back  ☐ Free Gifts  ☐ Travel Points  ☐ Award Points
☐ Discounts  ☐ Sales  ☐ Services  ☐ Status

FIG. 32

TRANSACTION PROCESSING ENTITY DEVICE SUPPORT OF AN INTEGRATED OFFER NETWORK

CROSS-REFERENCE TO RELATED PATENT APPLICATIONS

The present application is a continuation application of U.S. patent application Ser. No. 12/413,033, filed Mar. 27, 2009, and entitled "Transactional Processing Entity Device Support of an Integrated Offer Network" which claims priority to U.S. Prov. App. Ser. No. 61/091,422, entitled "Transactional Processing Entity Device Support of an Integrated Offer Network" filed Aug. 24, 2008.

This patent application shares a common Specification and figures with the following co-pending applications:

1. U.S. Utility application Ser. No. 12/413,075, entitled "Issuer Device Support of an Integrated Offer Network", filed Mar. 27, 2009, which is a non-provisional of U.S. Provisional Application No. 61/091,423, entitled "Issuer Device Support of an Integrated Offer Network" filed Aug. 24, 2008; and
2. U.S. Utility application Ser. No. 12/413,097, entitled "Merchant Device Support of an Integrated Offer Network", filed Mar. 27, 2009, which is a non-provisional of U.S. Provisional Application No. 61/091,425, entitled "Merchant Device Support of an Integrated Offer Network" filed Aug. 24, 2008.

STATEMENT REGARDING FEDERAL SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF INVENTION

1. Technical Field of the Invention

This invention relates generally to financial transaction processing systems and more particularly to incentive offers, services, and/or features within such systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. In an effort to promote use of credit cards for purchasing goods and/or services, issuers, merchants, and/or the transactional processing entities (e.g., Visa( )) offer a variety of incentive programs. For example, a transaction processing entity may offer incentive programs relating to a particular merchant, by a particular category of goods and/or services from some merchants, by a type of incentive program (e.g., free shipping), and/or by features (e.g., lost/stolen card reporting). As another example, merchant's may offer discounts, free shipping, save $X on purchases greater than $Y, etc. As yet another example, an issuer may offer features such as Z % annual bonus, AA % reward on travel or entertainment, etc.

Such merchant offers, issuer features, and/or transactional processing entity services are managed in multiple areas of a financial transaction processing system due to different incentive programs targeting different market needs for issuers and/or merchants. As such, there are many incentive program opportunities for merchants and/or issuers to participate in, but do not because they are unaware of them or are unable to access them due to the multiple area management.

Therefore, a need exists for a method and apparatus of providing an integrated offers, features, and/or services.

BRIEF DESCRIPTION OF THE SEVERAL VIEWS OF THE DRAWINGS

FIGS. 17 and 18 are logic diagrams of an embodiment of a method performed by the transactional processing entity device in accordance with the present invention;

FIG. 22 is a logic diagram of another embodiment of a method performed by the transactional processing entity device in accordance with the present invention;

FIG. 23 is a diagram of an example of a merchant profile in accordance with the present invention;

FIG. 25 is a diagram of an example of a list of offers for a merchant in accordance with the present invention;

FIG. 26 is a diagram of an example of a merchant's offer data file in accordance with the present invention;

FIG. 27 is a logic diagram of another embodiment of a method performed by the transactional processing entity device in accordance with the present invention;

FIGS. 28 and 29 are diagrams of an example of modifying a merchant's offer data file in accordance with the present invention;

FIG. 30 is a logic diagram of another embodiment of a method performed by the transactional processing entity device in accordance with the present invention;

FIG. 31 is a logic diagram of another embodiment of a method performed by the transactional processing entity device in accordance with the present invention;

FIG. 32 is a diagram of an example of a card holder profile in accordance with the present invention.

DETAILED DESCRIPTION OF THE INVENTION

Figure 1:
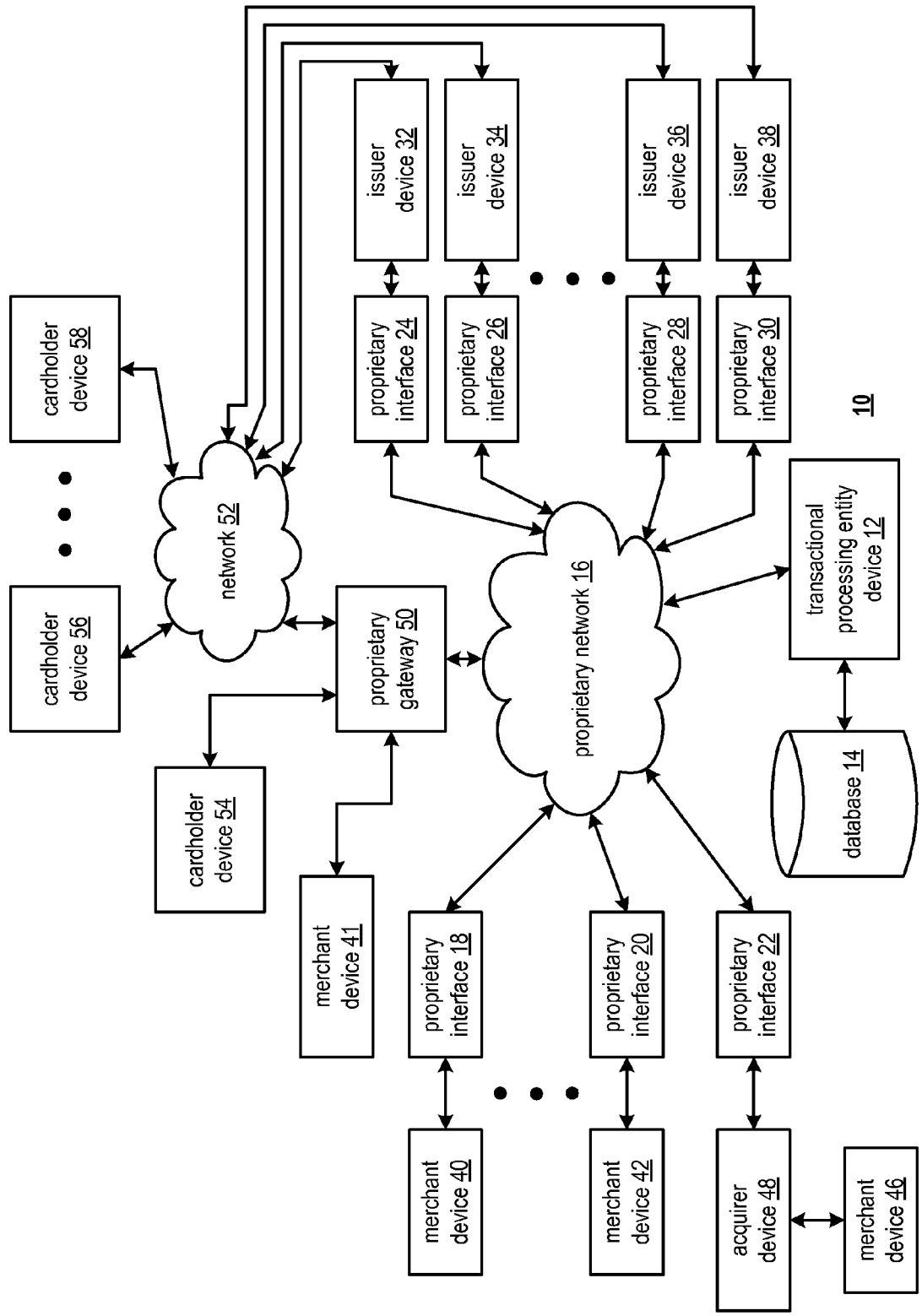
FIG. 1 is a schematic block diagram of an embodiment of a financial transaction processing system in accordance with the present invention.

FIG. 1 is a schematic block diagram of an embodiment of a financial transaction processing system 10 that includes that includes a financial transaction entity device 12, a database 14, a proprietary network 16, a plurality of proprietary interfaces 18-30, a plurality of issuer devices 32-38, a plurality of merchant devices 40-46, one or more acquirer devices 48, a proprietary gateway 50, a network 52 (e.g., the internet), and a plurality of cardholder devices 54-58. A merchant device 40-46 may be associated with one or more merchants that sells products and/or services. Such a merchant may have a single locally owned store, a chain of stores located anywhere in the world, and/or an e-business. An issuer device 32-38 is associated with an issuer of one or more types of credit cards (e.g., personal, business, pre-paid, debit, auto pay, single use, various status levels, customized logo, etc.).

The payment entity device 12, the database 14, and the proprietary network 16 may be operated and maintained by a single transactional processing entity to facilitate integration of offers, features, and/or services. For example, Visa, Inc. may provide its VisaNet® as the proprietary network 16 and have one or more computing devices (e.g., computers, servers, super computers, main frames, etc.) coupled to the proprietary network 16 to function as the transactional processing entity device 12, which may have one or more databases 14 coupled thereto.

In general, the transaction processing entity device 12 communicates with one or more of the plurality of merchant devices 40-46 to collect offers they support. For example, the offers may be product related (e.g., buy a specific pair of jeans, get five dollars off), may be product category related (e.g., buy golf merchandize, get ten percent off), may be service related (e.g., eye exam for seventy-five dollars); may be service category related (e.g., accounting services), may be generic (e.g., get two percent off on all purchases; get free shipping with purchases greater than fifty dollars; save fifteen dollars on purchases greater than two hundred dollars, etc.), may be consumer type related (e.g., men age 20-35; women age 20-35; golf enthusiasts; apparel enthusiasts, etc.), may be credit card status related (e.g., pre-paid, business, debit, gold status, platinum, etc.), may be card issuer related (e.g., Bank A issued cards, Bank C issued cards, etc.), may be location related (e.g., all California stores; all San Jose, Calif. stores; a specific store; etc.), and/or may be combinations (e.g., buy first eye wear at full price, get second one for half price; buy product X, get product Z for free).

The communication between the transactional processing entity device 12 and one or more of the merchant devices 40-46 may occur via the proprietary network 16 and a proprietary interface 18-22 or via the proprietary network 16 and the proprietary gateway 50. For example, merchant device 40 communicates with the transactional processing entity device 12 via proprietary interface 18 and the proprietary network 16. Note that the proprietary interface 18-22 is a proprietary node, modem, bridge, etc., that serves as a private connection point to the proprietary network 16, which ensures that only the associated device (e.g., merchant device 40 for interface 18) has access to the proprietary network 16.

As another example, merchant device 46 may communicate with the transactional processing entity device 12 via an acquirer device 48, which is coupled to a proprietary interface 22. In this example, the acquirer device 48 functions as a communication relay between the merchant device 46 and the transactional processing entity device 12. Note that the merchant device 46 may be coupled to the acquirer device 48 via the network 52.

As a further example, example, merchant device 41 communicates with the transactional processing entity device 12 via the proprietary gateway 26 and the proprietary network 16. The proprietary gateway 26 is a proprietary node, modem, bridge, etc., that serves as a public connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

In addition to communicating with the merchant devices 40-46, the transactional processing entity device 12 communicates with the issuer devices 32-38 to determine the issuer's offer type preferences or criteria. For example, the issuer may request a general level of offers that it will use to select specific offer programs for various groups of cards (e.g., gold, platinum, a company card, a consumer enthusiast card [e.g., tennis], a gas card, etc.). The general level of offer criteria may include one or more generic offers from some or all of the merchants, specific products and/or product categories from some or all of the merchants, specific services and/or services categories from some or all of the merchants, etc. In this instance, the transactional processing entity device 12 compiles the list of offers in accordance with these criteria and provides a corresponding list of offers data file to the issuer device.

As another example, the issuer may request a specific level of offers for a specific group of credit cards (e.g., cards with Company A's logo). The specific level of offers requested may be for one or more offers supported by Company A. In this instance, the transactional processing entity device 12 compiles offers supported by Company A and provides a corresponding list of offers data file to the issuer device.

The issuer device 32-38 processes the list of offers for a given group of cards (e.g., gold card, cards with Company A's logo, etc.) to produce a list of available offers for the given group. The list of available offers may be provided to the transactional processing entity device 12 and/or may be maintained by the issuer device 32-38.

A cardholder of a card in the given group accesses the list of available offers via a cardholder device 54-58 from the transactional processing entity device 12 and/or the issuer device 32-38. Once accessed, the cardholder device 54-58 selects one or more of the available options for its card and provides the selection(s) to the transactional processing entity device 12 (and to the issuer device 32-38). The transactional processing entity device 12 stores the selections for use when transactions are processed for the card.

When a transaction is processed for the card, the transactional processing entity device 12 retrieves the selected offer or offers and processes the transaction in accordance therewith. For example, if the selected offer is $10 off with a purchase of $75 or more, the transactional processing entity device determines when a transaction amount for the card exceeds $75. If not, the $10 off is not applied. If the transaction amount is greater than $75, the transactional processing entity device 12 processes the transaction with the $10 off applied.

In addition to offering its cardholders offers from various merchants, an issuer can offer issuer features and/or transactional processing entity services. Issuer features include, but are not limited to, one or more of annual fees, introductory annual percentage rate (APR), a fixed APR, a variable APR, cash back on purchases, reward points, and fund transfers. Transactional processing entity services include, but are not limited to, one or more of auto rental collision damage waiver, cardholder inquiry service, emergency cash disbursement, card replacement, lost/stolen card reporting, zero liability, lost luggage reimbursement, purchase security, rewards program, roadside dispatch, travel assistance, emergency assistance, travel accident insurance, sports and entertainment services, concierge services, warranty management, exclusive shopping, and year end summary reporting.

If an issuer offers its cardholders in a specific group of cards issuer features and/or transactional processing entity services, the features and/or services are included in the list of available offers. In addition to selecting one or more offers, the cardholder device 54-58 may select one or more of the available issuer features and/or transactional processing entity services for its card. The cardholder device 54-58 provides the selection(s) to the transactional processing entity device 12 (and maybe to the issuer device 32-38). The transactional processing entity device 12 stores the selections for use when transactions are processed for the card.

As the transactional processing entity device 12 is processing transactions for a variety of cards, it monitors one or more of, but not limited to, the type of purchases, the amount of purchases, the use of selected offers, features, and/or services for the purchases, type status or type of card, cardholder data, frequency of use, and time of day of purchase. From this data, the transactional processing entity device can generate recommended offers for individual merchants, can generate recommended features for individual issuers, and can generate recommended services for the transactional processing entity. The recommendations may include adding a new offer, feature, and/or service; deleting an offer, feature, and/or service; and/or modifying an offer, feature, and/or service. In addition, the transactional processing entity device 12 may generate a list of recommended offers, features, and/or services for an individual cardholder based on the collected transactional data.

In addition, the transactional processing entity device may automatically update the offers supported by the merchant, the list of offers provided to the issuer, the list of available offers, features, and/or services provided to the cardholder as new offers, features, and/or services become available, as offers, features, and/or services change, and/or as offers, features, and/or services expire. In this regard, merchants, issuers, and/or cardholder are provided with a centrally managed and maintained database of offers, features, and/or services, which benefits merchants of any size by getting their offers to a wider audience, which benefits issuers by having a centralized database of merchant offers that can be integrated with its features and/or transactional processing entity services, and which benefits cardholders by having a wide variety of offers, features, and/or services to select.

Figure 2:
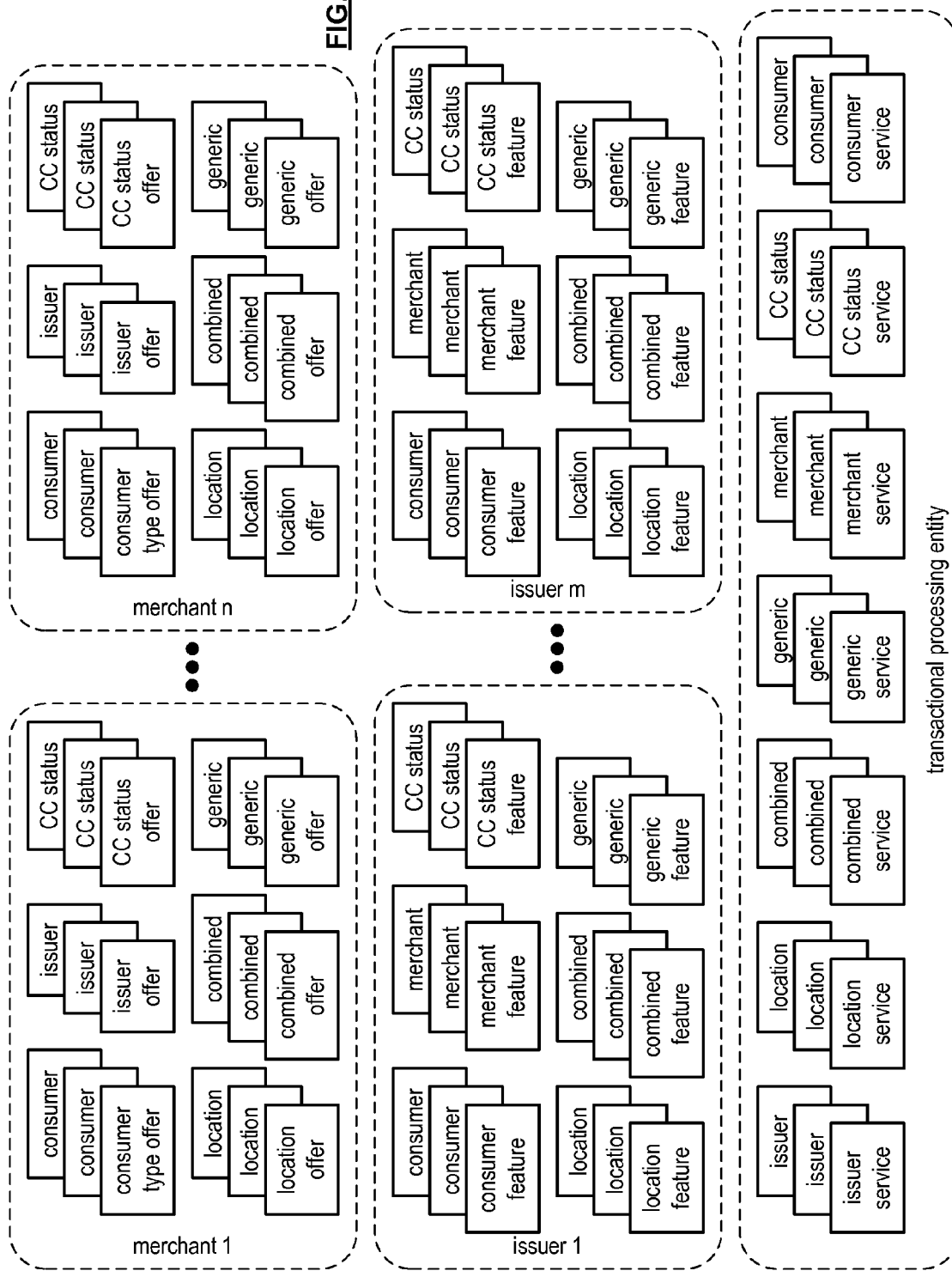
FIG. 2 is a diagram of an example of an integrated collection of offers, features, and/or services in accordance with the present invention.

FIG. 2 is a diagram of an example of an integrated collection of offers, features, and/or services collected by the transactional processing entity device 12. In this example, the transactional processing entity device 12 has communicated with a plurality of merchant devices 40-46 (e.g., merchant 1 through merchant n) to collect their merchants' offers. The collection of offers will be discussed in greater detail with reference to FIGS. 15-18 and 22-29. The offers may be one or more consumer type based offers (e.g., special sales and/or discounts for men, women, children, cardholders that spend more that X per month on a credit card, sports enthusiast, apparel enthusiast, etc.), one or more issuer related offers (e.g., card issued from Bank Q, get 1% discount), one or more credit cardholder status based offers (e.g., gold status get 1% discount, platinum status get 2% discount, etc.), one or more location specific offers (e.g., get 5% off all purchases made at store X in City Y, State Z, get 2% off of purchases made in stores in City AA, State BB, etc.), one or more combined offers (e.g., which provides restrictions for which offers can be combined and/or lists specific offers that are combined), and/or one or more generic offers (e.g., 1 merchant bonus point for each dollar spent; $10 off of purchases greater than $75; free shipping with purchases greater than $100; 10% for purchases made between 2-5 PM eastern time, etc.).

In this example, the transactional processing entity device 12 organizes the offers based on the merchant supporting them. Alternatively, the transactional processing entity device 12 may organize the offers based on the type of offer (e.g., generic, consumer specific, issuer, credit card status, etc.), based on value of the offer, and/or any other desired segmentation of the offers.

The transactional processing entity device 12 may also store issuer features supported by a plurality of issuer devices (e.g., issuer 1 through issuer m). In this example, the transactional processing entity device 12 has communicated with a plurality of issue devices 32-38 to collect their issuers' features. The collection of features will be discussed in greater detail with reference to FIGS. 15-21. The issuer features may include one or more of, but not limited to, consumer type features (e.g., various annual APR, reward points, etc. for cardholders spending more that X per month on a credit card, sports enthusiast, apparel enthusiast, etc.), merchant features (e.g., buy from Merchant A, get 2× reward points), credit cardholder status features (e.g., additional various reward points based on status, various APR based on status, various annual fees based on status, etc.), location features (e.g., use at home get X reward points, use while traveling get Y reward points, etc.), combined features (e.g., which provides restrictions for which features can be combined and/or lists specific features that are combined), and generic features (e.g., basic reward programs).

The transactional processing entity device 12 may further store the services its transactional processing entity supports. Such services include one or more of, but are not limited to, issuer specific services (e.g., use Bank 1 credit card, get free purchase security), location specific services (e.g., use in US, get free road side assistance), combined services (e.g., which provides restrictions for which services can be combined and/or lists specific services that are combined), generic services (e.g., available for all cards and may include auto rental car collision damage waiver, cardholder inquiry service, emergency cash disbursement, card replacement, lost/stolen card reporting, etc), merchant specific services (e.g., purchase from merchant A, get exclusive shopping options), credit card status services (e.g., first level get generic services, second level gets basic plus second level services, third level gets lower level services plus third level services [e.g., Visa Signature® card]), and/or consumer type services (e.g., travel assistance for travel enthusiasts, sports and entertainment ticket services for such enthusiasts, etc.).

The transactional processing entity device 12 may continually, or periodically, update the merchant offers, issuer features and/or services with new, modified or expired offers, features, and/or services. Such updating requires communication with the corresponding merchant devices 40-46 and/or issuer devices 32-38 as will be discussed in greater detail below.

Figure 3:
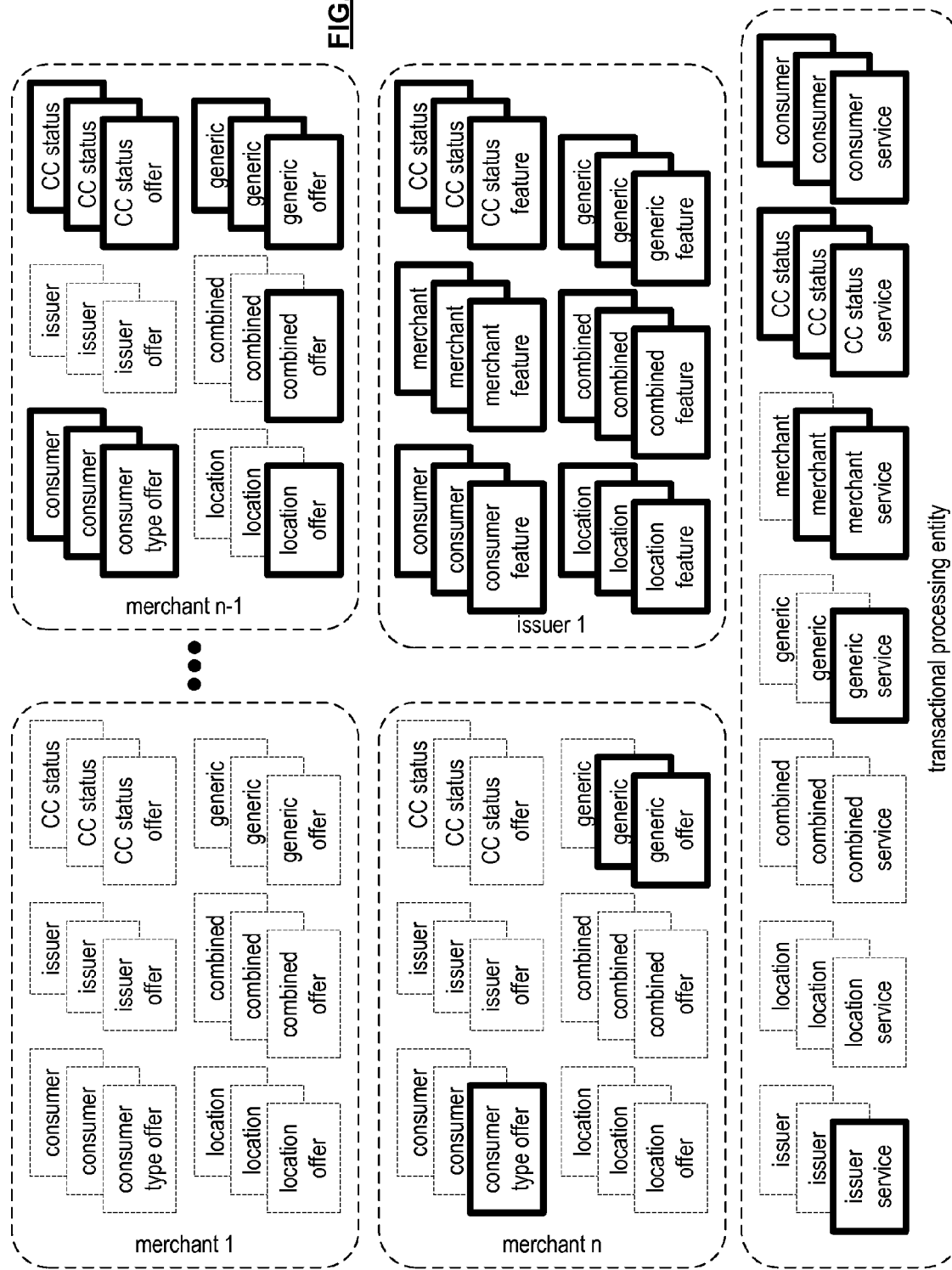
FIG. 3 is a diagram of an example of transactional processing entity selected offers, features, and/or services made available to an issuer in accordance with the present invention.

FIG. 3 is a diagram of an example of transactional processing entity device providing selected offers, features, and/or services to an issuer device in accordance with the issuer's offer criteria. In this example, the transactional processing entity device 12 takes the data in compiled in the example of FIG. 2 and filters it based on the issuer's offer criteria. The offer criteria may exclude any offers supported by Merchant 1 and any issuer based offers. The offer criteria may further include offers for specific consumer types, for specific locations, credit card status, and/or generic offers. In this example, the offers that are provided to the issuer are shown in bold lines while the offers that were filtered out based on the offer criteria are shown in light-dashed lines.

In addition to providing offers in accordance with the offer criteria, which may be for a specific group of cards or for several groups of cards that the issuer will parse prior to making them available to the cardholders, the transactional processing entity device 12 provides the issuer with the features stored by the transactional processing entity device 12.

Further, the transactional processing entity device 12 may select one or more transactional processing entity services to provide to the issuer device based on issuer's offer criteria. In this example, the transactional processing entity device 12 filters its services to yield one issuer based service, one generic service, a pair of merchant based services (excludes any services related to Merchant 1), a plurality of credit card status services, and a plurality of consumer type services. Note that is just an example and any number of offers, features, and/or services may be provided to the issuer device.

Figure 4:
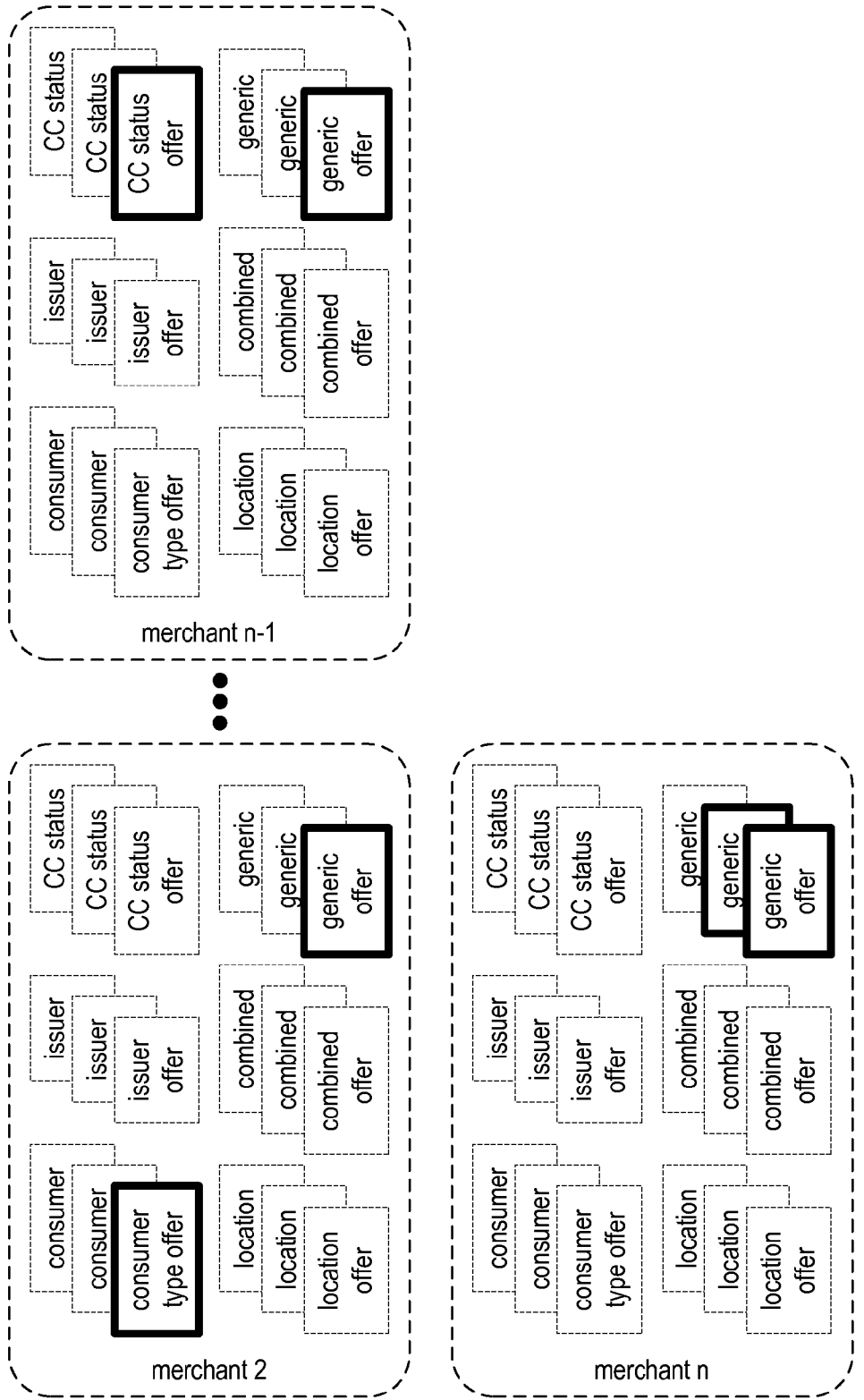
FIG. 4 is a diagram of an example of issuer selected offers made available to a first group of transactional cards in accordance with the present invention.

FIG. 4 is a diagram of an example of issuer selected offers made available to a first group of transactional cards. In this example, the issuer device is only allowing offers to be selected by cardholders of a card in the first group of transactional cards. Further, the issuer device has selected just few of the offers (i.e., the ones with bold lines) it was provided by the transactional processing entity device in FIG. 3 for selection by credit cardholders of the first group. These selections are provided to the transactional processing entity device 12 along with the identity of the issuer and the card information regarding the transactional cards in the first group. The transactional processing entity device 12 stores this information and awaits communication from a cardholder device 54-58 associated with a card in the first group. As an alternative, the transactional processing entity device 12 may generate the available offers for the issuer based on group specific offer criteria and provide the available offers to the issuer device.

Figure 5:
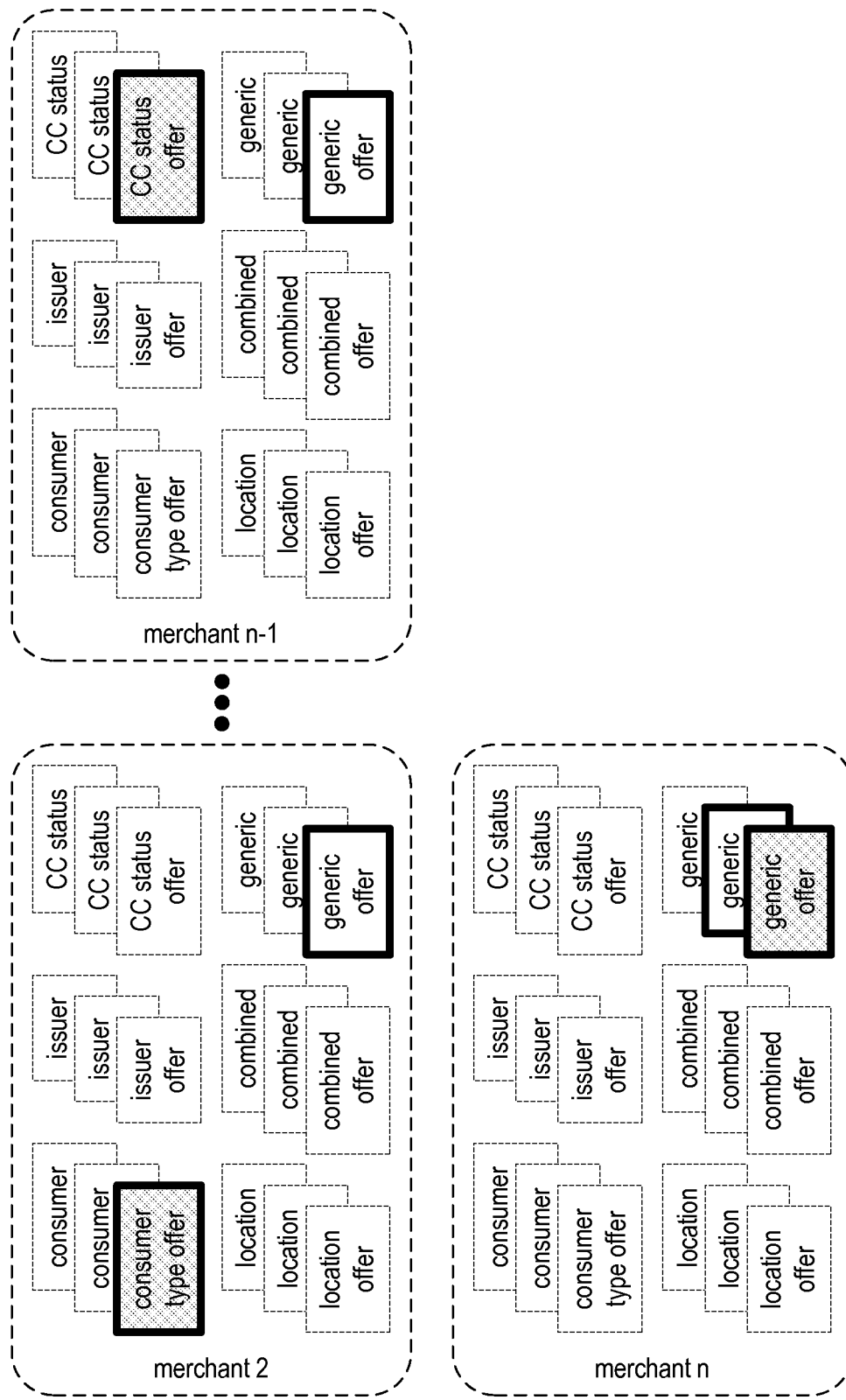
FIG. 5 is a diagram of an example of selected offers made by a card holder of the first group of transactional cards in accordance with the present invention.

FIG. 5 is a diagram of an example of selected offers made by a card holder of the first group of transactional cards. In this example, a cardholder device 54-58 is communicating with the transactional processing entity device 12 to select one or more of the available offers. In this example, the gray shaded offers have been selected via the credit cardholder device 54-58. The transactional processing entity device 12 stores the selections for use when processing transactions of the card associated with the credit cardholder device 54-58.

Figure 6:
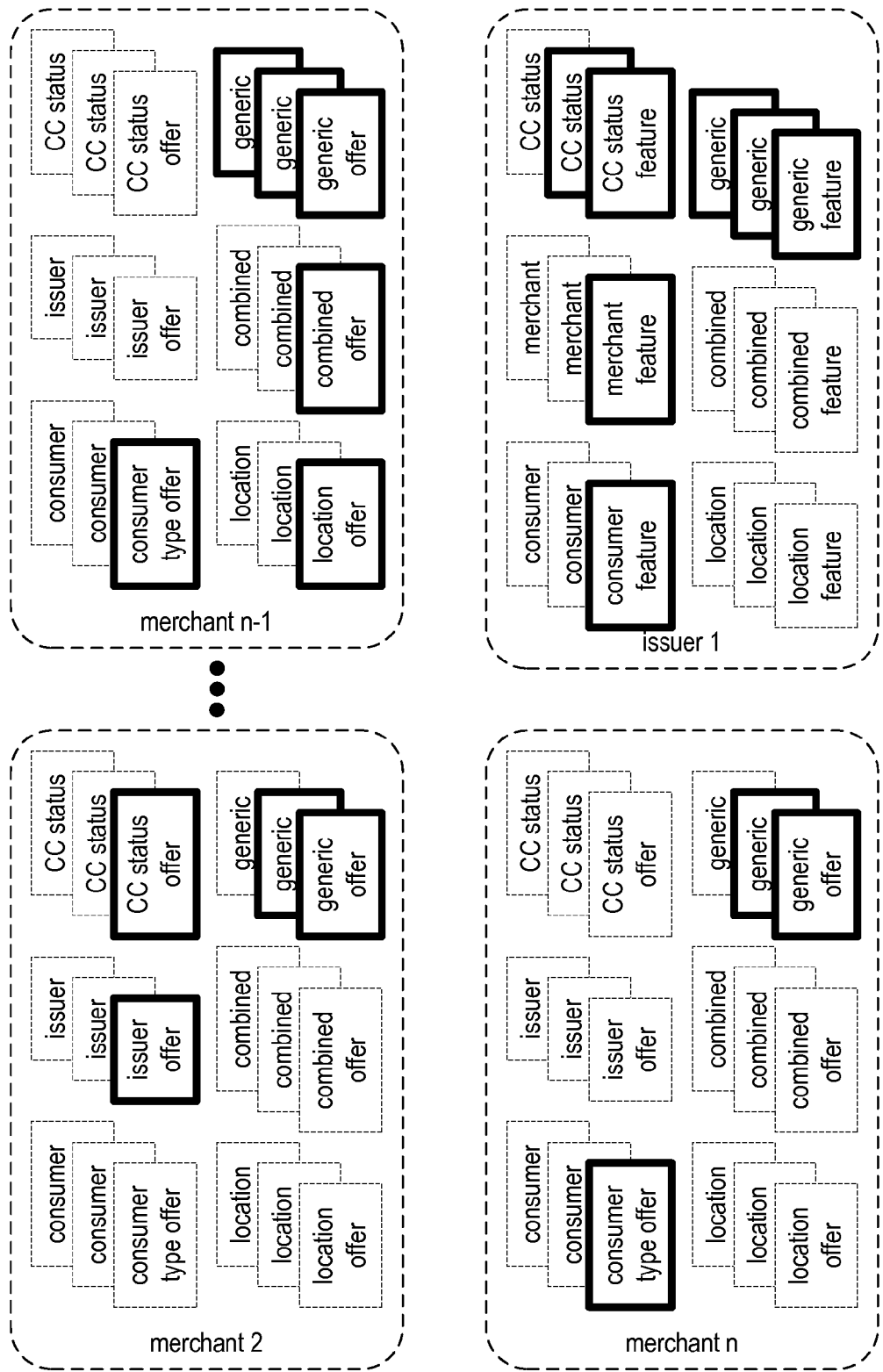
FIG. 6 is a diagram of an example of issuer selected offers and/or features made available to a second group of transactional cards in accordance with the present invention.

FIG. 6 is a diagram of an example of issuer selected offers and features made available to a second group of transactional cards, which is of a higher status than the first group. In this example, the issuer device is allowing offers and issuer features to be selected by cardholders of a card in the second group of transactional cards. The available offers and features are shown with bold lines while unavailable offers and features are shown with light-dashed lines. The selections of available offers and features are provided to the transactional processing entity device 12 along with the identity of the issuer and the card information regarding the transactional cards in the second group. The transactional processing entity device 12 stores this information and awaits communication from a cardholder device 54-58 associated with a card in the second group. As an alternative, the transactional processing entity device 12 may generate the available offers and/or features for the issuer based on group specific offer criteria and provide the available offers to the issuer device.

Figure 7:
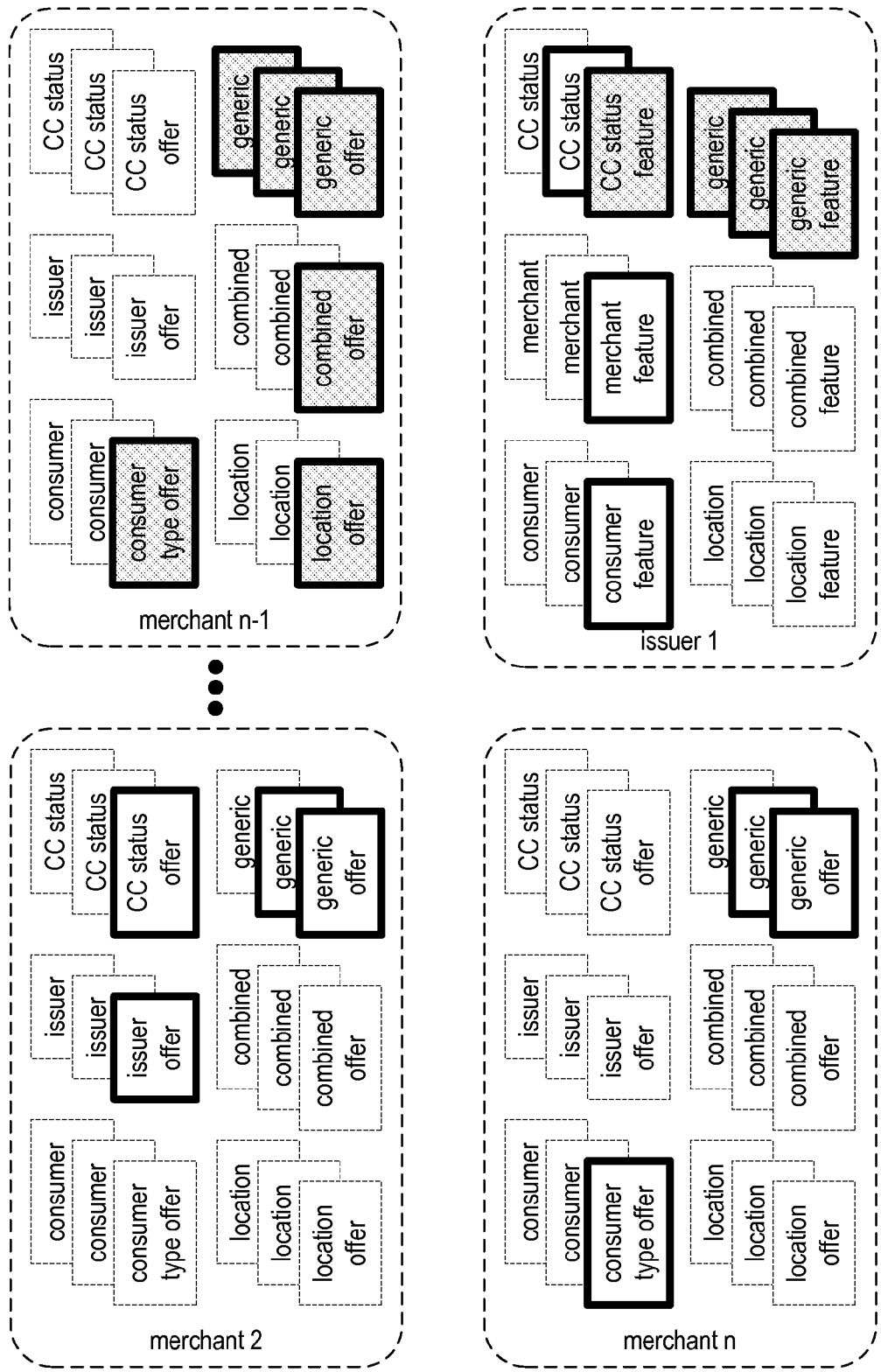
FIG. 7 is a diagram of an example of selected offers and/or features made by a card holder of the second group of transactional cards in accordance with the present invention.

FIG. 7 is a diagram of an example of selected offers made by a card holder of the second group of transactional cards. In this example, a cardholder device 54-58 is communicating with the transactional processing entity device 12 to select one or more of the available offers and/or one or more of the available features. In this example, the gray shaded offers and features have been selected via the credit cardholder device 54-58. The transactional processing entity device 12 stores the selections for use when processing transactions of the card associated with the credit cardholder device 54-58.

Figure 8:
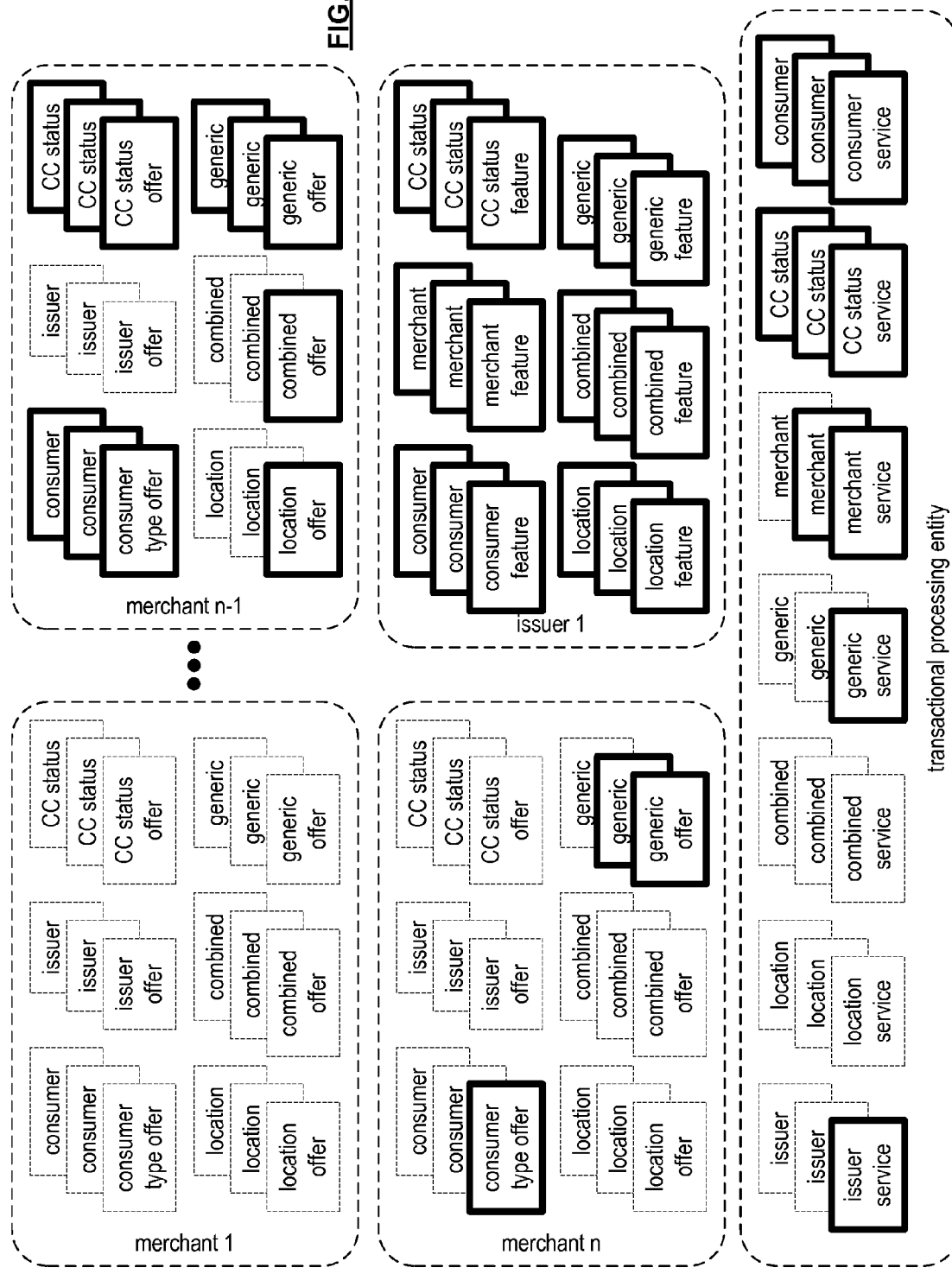
FIG. 8 is a diagram of an example of issuer selected offers, features, and/or services made available to a third group of transactional cards in accordance with the present invention.

FIG. 8 is a diagram of an example of issuer selected offers, features, and services made available to a third group of transactional cards, which is of a higher status than the first and second groups. In this example, the issuer device is allowing offers, issuer features, and transactional processing entity services to be selected by cardholders of a card in the third group of transactional cards. The available offers, features, and services are shown with bold lines while unavailable offers, features, and services are shown with light-dashed lines. The selections of available offers, features, and services are provided to the transactional processing entity device 12 along with the identity of the issuer and the card information regarding the transactional cards in the third group. The transactional processing entity device 12 stores this information and awaits communication from a cardholder device 54-58 associated with a card in the third group. As an alternative, the transactional processing entity device 12 may generate the available offers, features, and/or services for the issuer based on group specific offer criteria and provide the available offers to the issuer device.

Figure 9:
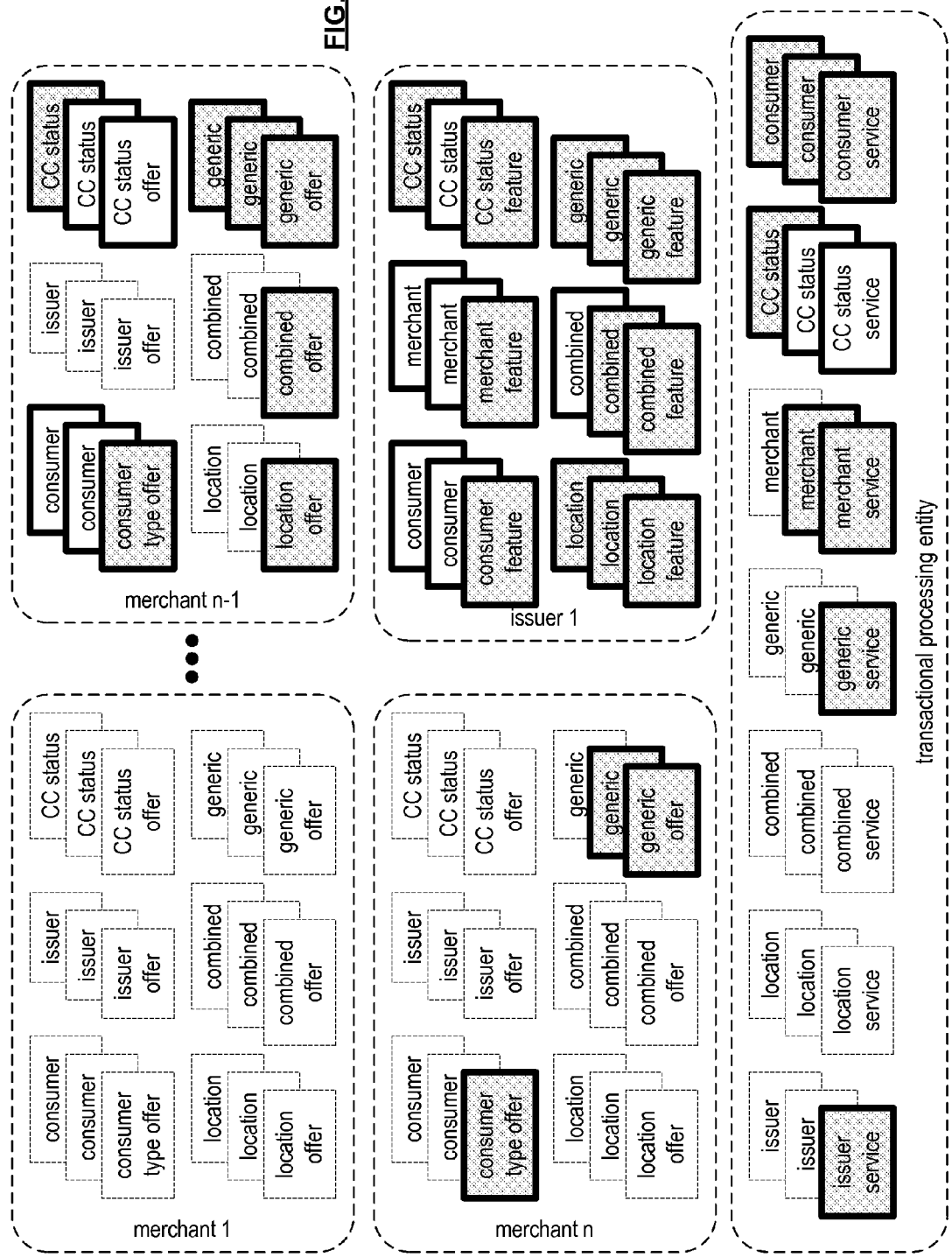
FIG. 9 is a diagram of an example of selected offers, features, and/or services made by a card holder of the third group of transactional cards in accordance with the present invention.

FIG. 9 is a diagram of an example of selected offers made by a card holder of the third group of transactional cards. In this example, a cardholder device 54-58 is communicating with the transactional processing entity device 12 to select one or more of the available offers, one or more of the available features, and/or one or more of the available services. In this example, the gray shaded offers, features, and services have been selected via the credit cardholder device 54-58. The transactional processing entity device 12 stores the selections for use when processing transactions of the card associated with the credit cardholder device 54-58.

As illustrated in the examples of FIGS. 2-9, the transactional processing entity device 12 provides a centralized repository of offers, features, and/or services that can be made available to cardholders via an associated issuer. In addition, the offers and/or services may be made available to cardholder devices by the transactional processing entity device 12 with little or no involvement of the issuer device 32-38.

Figure 10:
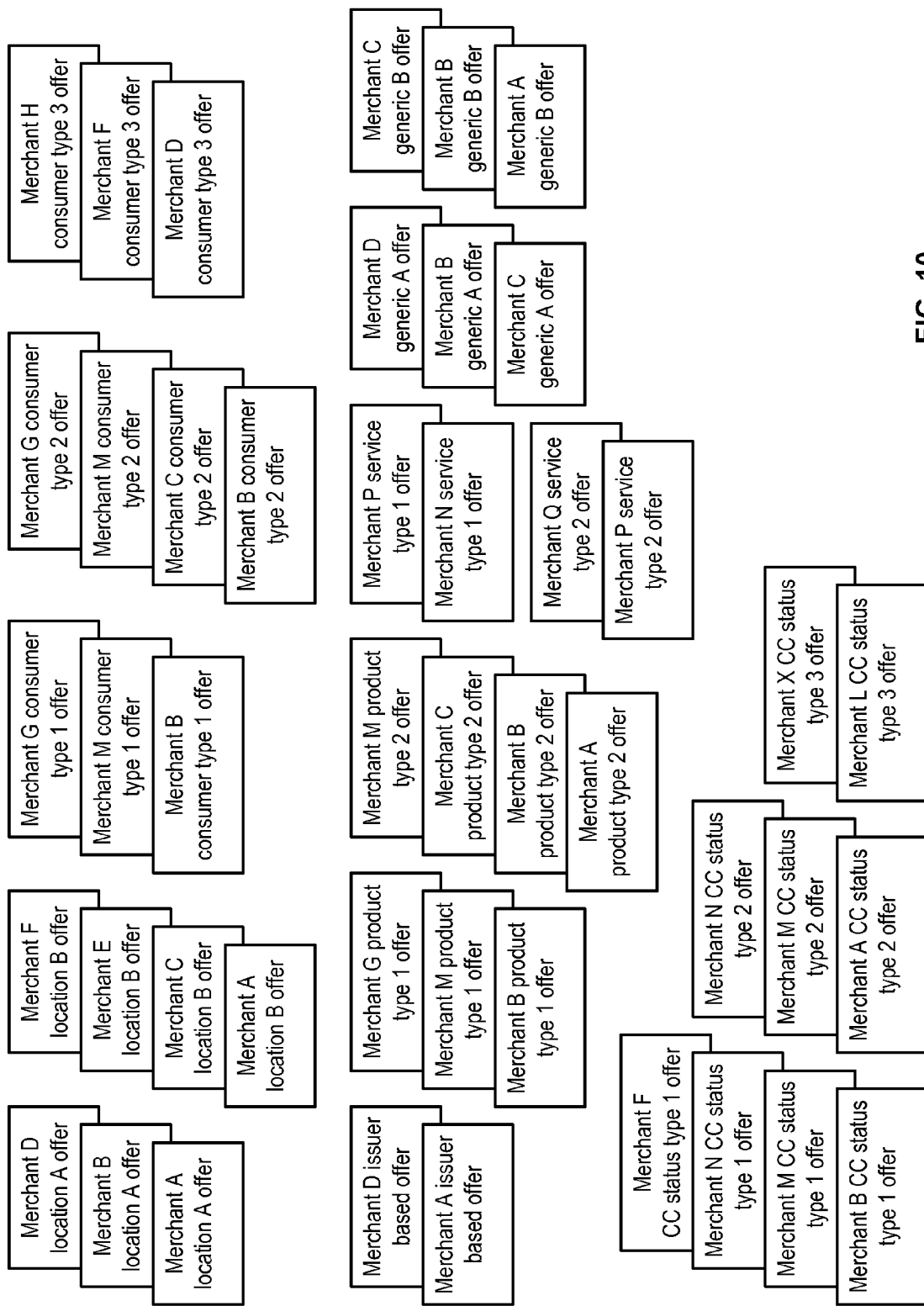
FIG. 10 is a diagram of another example of transactional processing entity selected offers, features, and/or services made available to an issuer in accordance with the present invention.

FIG. 10 is a diagram of another example of transactional processing entity device providing offers, features, and/or services to an issuer device. In this example, the transactional processing entity device 12 has taken the data of FIG. 3 (i.e., the example offers, features, and services that are in accordance with the issuer's offer criteria) and organized it based on type of offers, features, and/or services. For example, one grouping of offers may be for a specific location (e.g., location A [e.g., United States], which includes offers from Merchants A, B, and D) and a second grouping of offers may be for a second specific location (e.g., location B [e.g., California], which includes offers from Merchants A, C, E, and F). Such location specific offers may be for a particular type of product in a particular location. For example, one offer may relate to pick-up trucks in Texas and another offer may relate to hybrid cars in California.

As another example, offers may be grouped based on consumer types (e.g., type 1, 2, 3, etc.). For instance, consumer type 1 may be for men ages 35-50, consumer type 2 may be for women ages 35-50, and consumer type 3 may be for consumers with specific purchase habits (e.g., spends more than X per month an a credit card) and/or special interests (e.g., golf, movies, clothing, shoes, etc.). Other groupings of offers may be made based on merchant-issuer relationship, product type, service type, generic offer type, and credit card status. Note that more or less groupings may be made from the example categories and that more or less categories may be used to group the offers. Further note that an issuer may select a group of offers, individual offers, or any other combination of offers for a particular group of cards.

Figure 11:
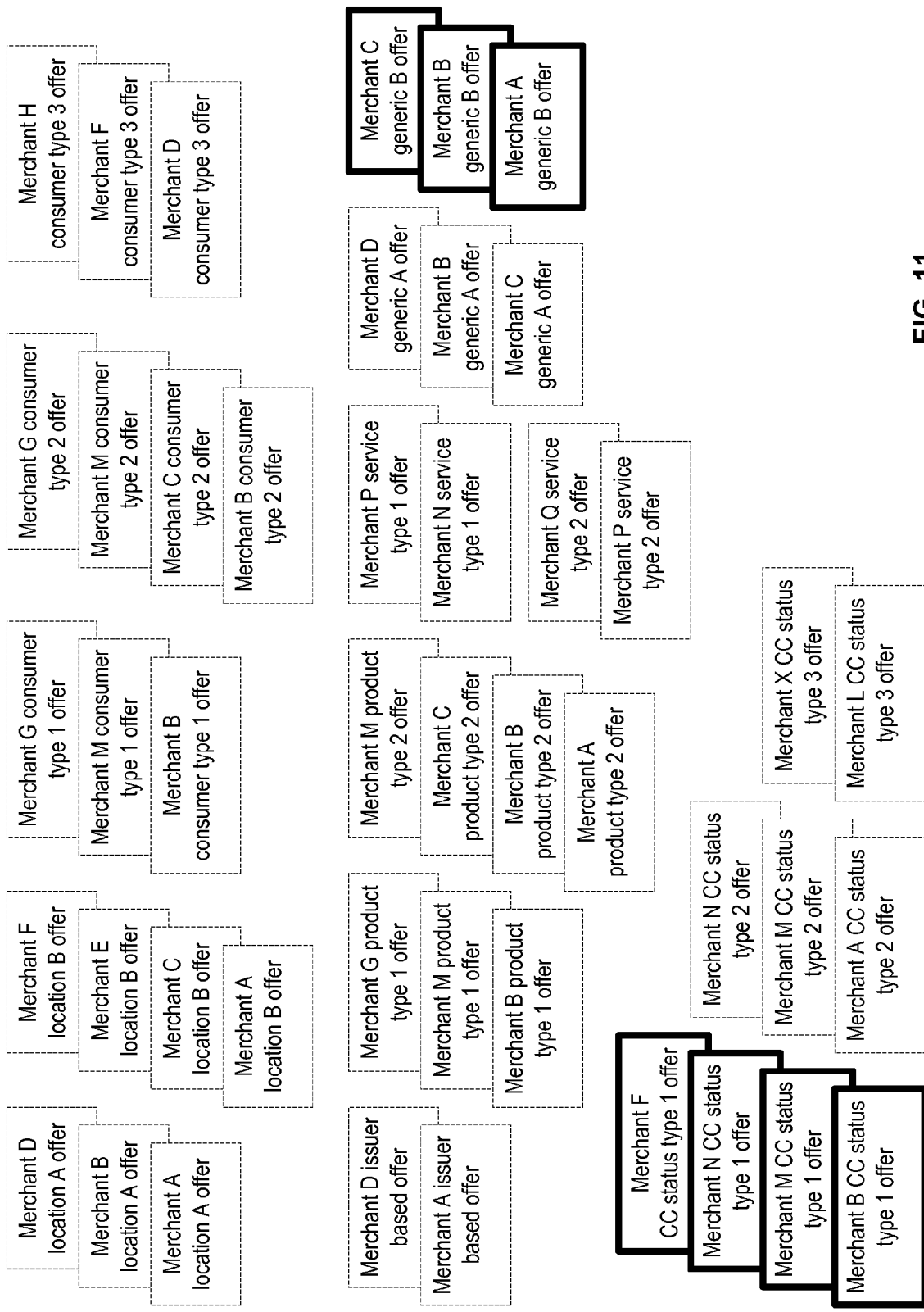
FIG. 11 is a diagram of another example of issuer selected offers made available to a first group of transactional cards in accordance with the present invention.

FIG. 11 is a diagram of another example of issuer selected offers made available to a first group of transactional cards. In this example, the issuer device has taken the data of FIG. 10 and selected two groups of offers (e.g., credit card status type 1 and generic B) for cards in the first group. These selections are provided to the transactional processing entity device 12 along with the identity of the issuer and the card information regarding the transactional cards in the first group. The transactional processing entity device 12 stores this information and awaits communication from a cardholder device 54-58 associated with a card in the first group. As an alternative, the transactional processing entity device 12 may generate the available offers for the issuer based on group specific offer criteria and provide the available offers to the issuer device.

Figure 12:
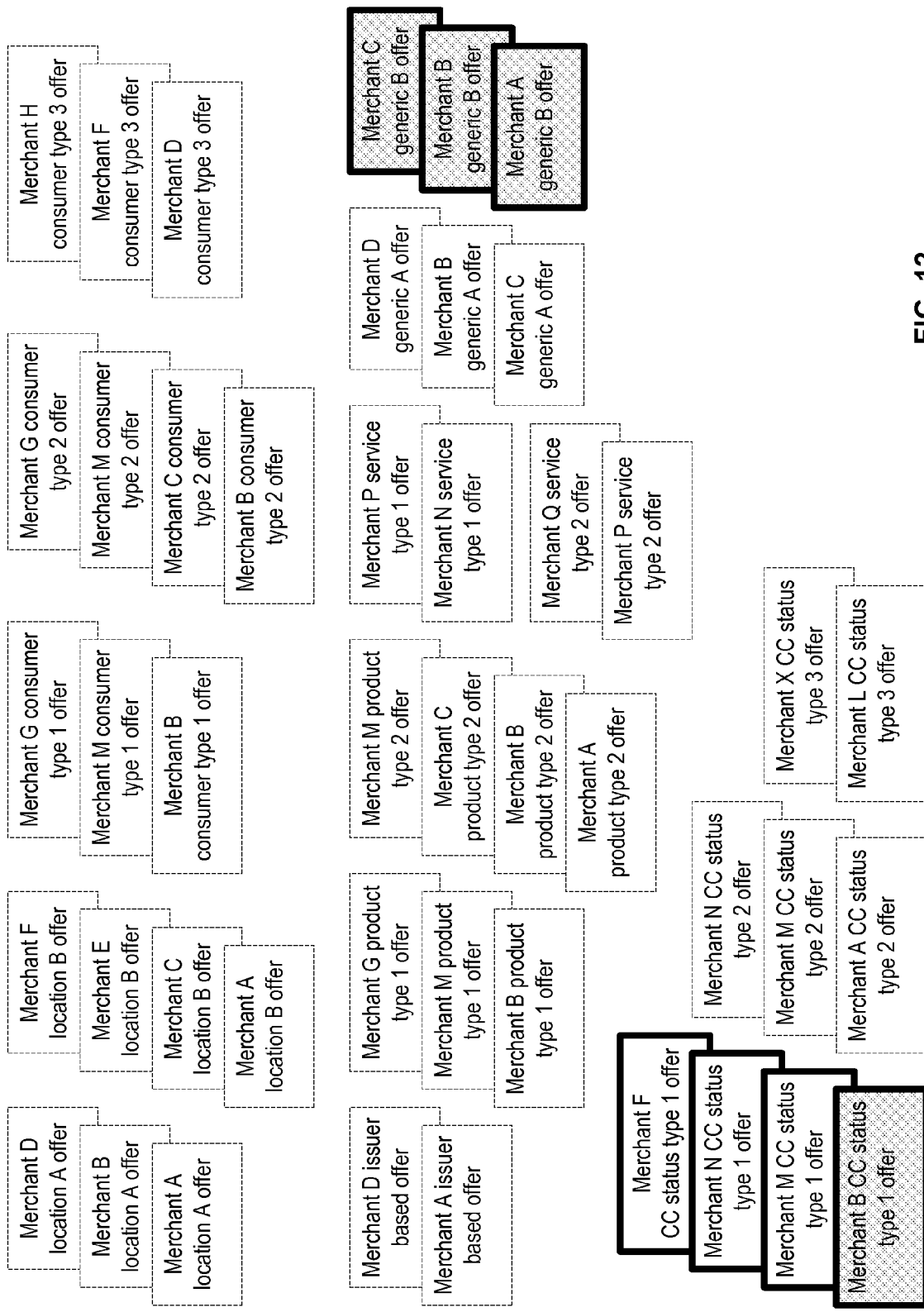
FIG. 12 is a diagram of another example of selected offers made by a card holder of the first group of transactional cards in accordance with the present invention.

FIG. 12 is a diagram of an example of selected offers made by a card holder of the first group of transactional cards. In this example, a cardholder device 5458 is communicating with the transactional processing entity device 12 to select one or more of the available offers. In this example, the gray shaded offers have been selected via the credit cardholder device 54-58. The transactional processing entity device 12 stores the selections for use when processing transactions of the card associated with the credit cardholder device 54-58.

Figure 13:
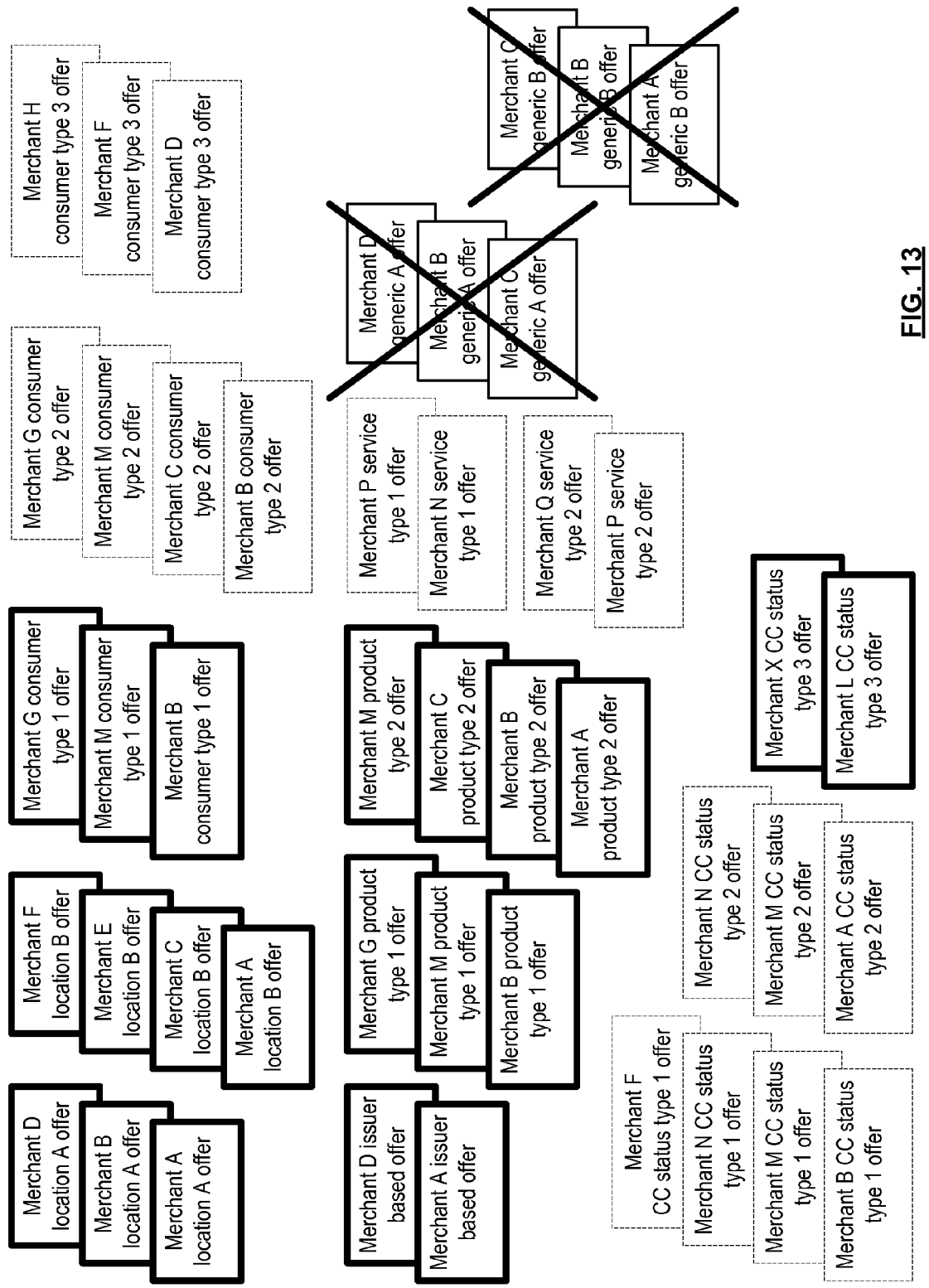
FIG. 13 is a diagram of another example of issuer selected offers made available to a third group of transactional cards in accordance with the present invention.

FIG. 13 is a diagram of an example of issuer selected offers made available to a third group of transactional cards, which is of a higher status than the first and second groups. In this example, the issuer device is allowing offers to be selected by cardholders of a card in the third group of transactional cards. The available offers are shown with bold lines while unavailable offers, features, and services are shown with light-dashed lines. In addition, generic offer types A and B are not available due to a conflict with one or more other groupings of offers. For example, the generic offers may conflict (e.g., be redundant or not allowed) with the merchant-issuer based offers.

The selections of available offers are provided to the transactional processing entity device 12 along with the identity of the issuer and the card information regarding the transactional cards in the third group. The transactional processing entity device 12 stores this information and awaits communication from a cardholder device 54-58 associated with a card in the third group.

Figure 14:
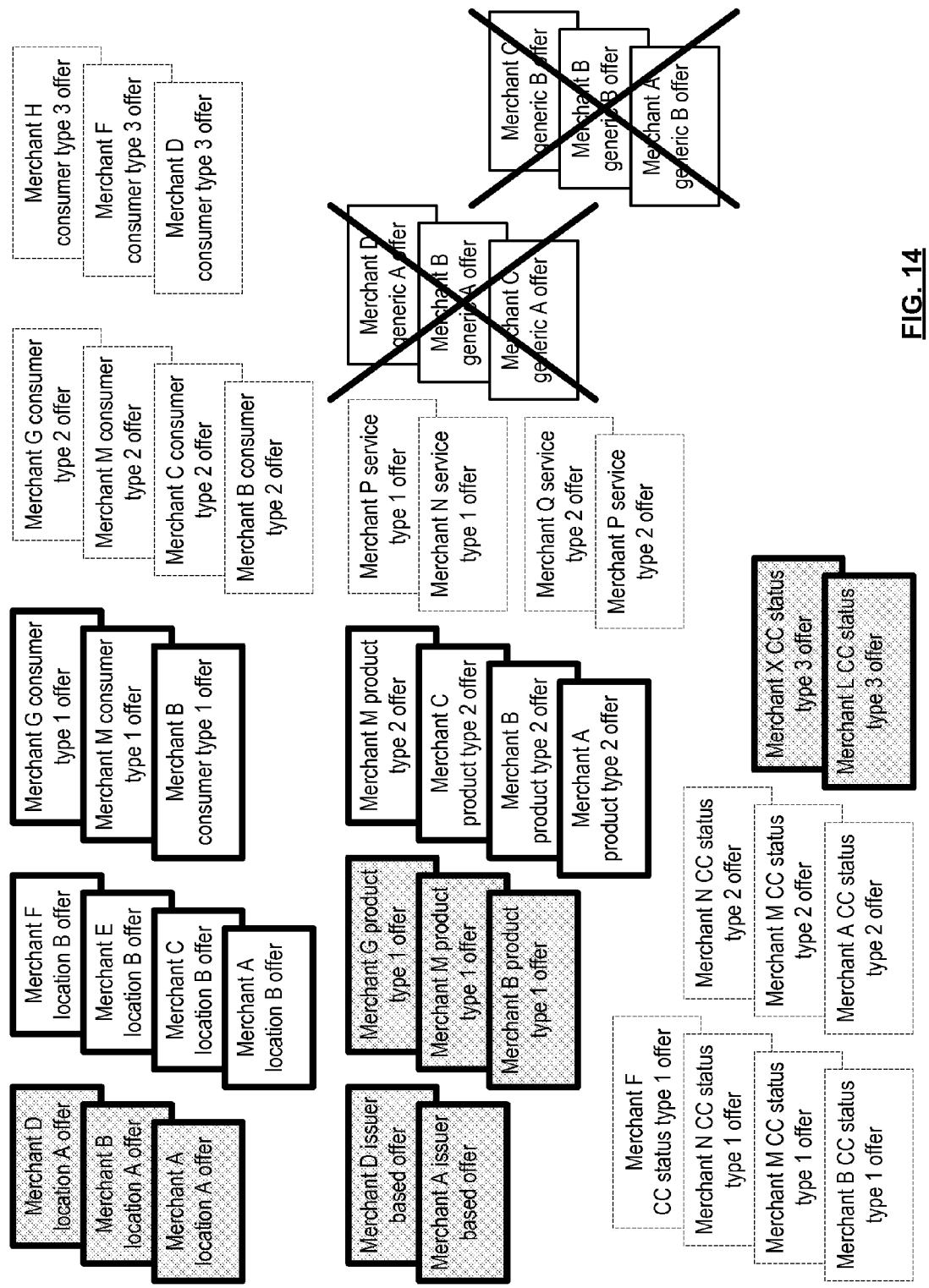
FIG. 14 is a diagram of another example of selected offers made by a card holder of the third group of transactional cards in accordance with the present invention.

FIG. 14 is a diagram of an example of selected offers made by a card holder of the third group of transactional cards. In this example, a cardholder device 54-58 is communicating with the transactional processing entity device 12 to select one or more of the available offers. In this example, the gray shaded offers have been selected via the credit cardholder device 54-58. The transactional processing entity device 12 stores the selections for use when processing transactions of the card associated with the credit cardholder device 54-58. As an alternative, the transactional processing entity device 12 may generate the available offers for the issuer based on group specific offer criteria and provide the available offers to the issuer device.

Figure 15:
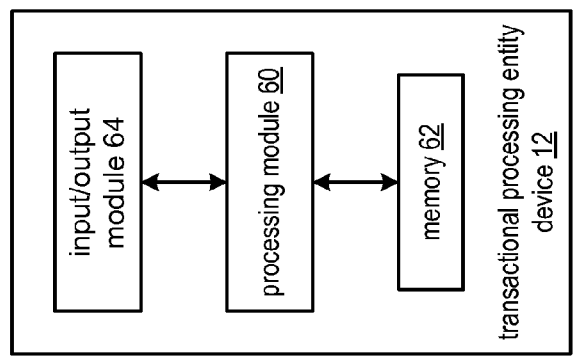
FIG. 15 is a schematic block diagram of an embodiment of a transactional processing entity device in accordance with the present invention.

FIG. 15 is a schematic block diagram of an embodiment of a transactional processing entity device 12 that includes a processing module 60, memory 62, and an input/output module 64. The input/output module 64 provides one or more input interfaces and one or more output interfaces for the processing module 60. The input interface may be for receiving inputs from a user via a mouse, keyboard, graphical user interface or other type of human-computer input mechanism. In addition, the input interface may be an input portion of a network card for receiving data from the proprietary network 16. The output interface may be for providing data to a user via a monitor, printer, email, web browser, etc. In addition, the output interface may be on output portion of a network card for transmitting data to the proprietary network 16.

The processing module 60 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 60 may have an associated memory 62 and/or an embedded memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 60 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-33.

Figure 16:
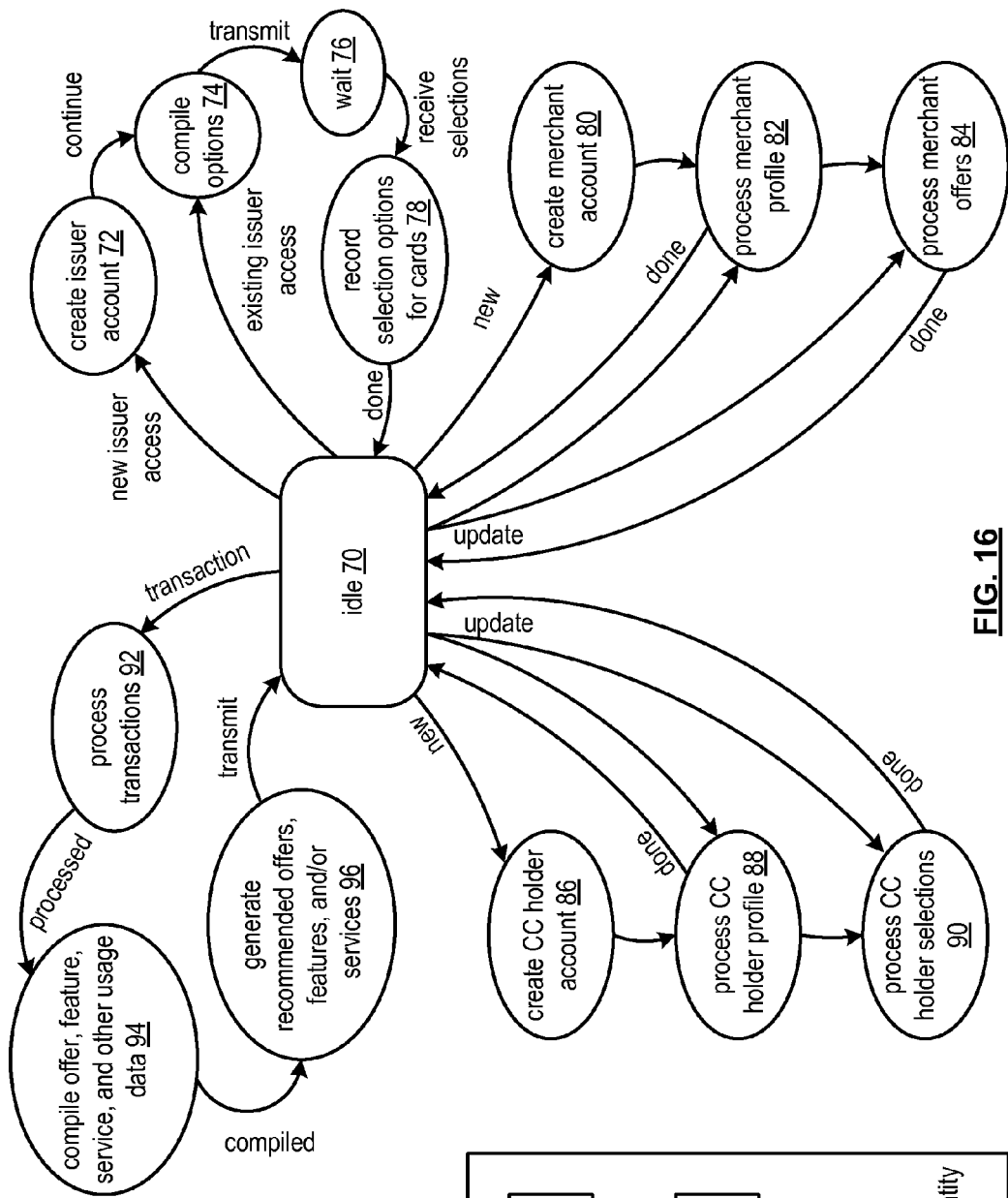
FIG. 16 is a state diagram of an embodiment of processing performed by the transactional processing entity device in accordance with the present invention.

FIG. 16 is a state diagram of an embodiment of processing performed by the transactional processing entity device 12. The state diagram includes four primary loops: one for setting up and maintaining an account with a merchant; a second setting up and maintaining an account with an issuer; a third for setting up and maintaining an account with a credit cardholder; and a fourth for processing transactions of a credit card in accordance with the credit cardholder account and compiling corresponding data.

With respect to an issuer, the transactional processing entity device 12 transitions from an idle state to create an issuer account state 72 when the issuer is new to the integrated offer, feature, and/or service program. In this state 72, the transactional processing entity device 12 communicates with the issuer device 32-38 to establish an account, which may include a user name, issuer identification information, a password, initial offer criteria, a service level selection (e.g., offers only; offers and services; offers, features, and services, automatic updating, etc.) and/or any other data to identify the issuer and the level of service to be provided.

The transactional processing entity device 12 proceeds to state 74 after completing the creation of the issuer account or from the idle state when an existing issuer is accessing its account. In this state 74, the transactional processing entity device may receive from the issuer a request to change its offer criteria, a request to change the level of service, a request to produce a compilation of offers for a given group of credit cards, and/or a request to produce a generic compilation of offers. Based on the corresponding request, the transactional processing entity device generates a message for the issuer, where the message includes an update to the offer criteria, an update to the level of service, a compilation of offers for a specific group, and/or a compilation of offers. The message is transmitted to the issuer device and the transactional processing entity device transitions to a wait state 76.

The transactional processing entity device 12 transactions to the record selection options for cards state 78 upon receiving one or more selections from the issuer device. This may be an iterative process where each selection made by the issuer device is transmitted to the transactional processing entity device, which verifies the selected option (e.g., offer, feature, or service). If the selected option is verified, it is stored in the list of available options for the group of cards. If the selected option is not verified (e.g., not on the list provided to the issuer, is incompatible with another selected option, etc.), the transactional processing entity device provides an error message to the issuer device. This iterative processing continues until all of the selected options are verified and stored by the transactional processing entity device. In the alternative, the issuer device may store the selection of the options and transmit them in one message to the transactional processing entity device. Upon successful recording the selected options for the group of cards, the transactional processing entity device transitions back to the idle state 70.

With respect to a merchant, the transactional processing entity device transitions from the idle state to create merchant account state 80 when it is a new merchant involved in the communication. In this state 80, the transactional processing entity device creates a merchant account that identifies the merchant, its device, level of service, and any other information needed to establish an account.

After the account is established, the transactional processing entity device transitions to the process merchant profile state 82, which may also be entered from the idle state 70 in response to an update request from the merchant device. In state 82, the transactional processing entity device creates or updates a merchant profile based on information provided by the merchant. The merchant profile includes at least one of: merchant name, merchant address(es), market focus, product categories, service categories, targeted consumer demographics.

After generating or updating the merchant profile, the transactional processing entity device transitions to the process merchant offers state 84, which may also be entered from the idle state in response to an update request. In state 84, the transactional processing entity device generates or updates a list of potential offers based on the merchant profile. The merchant device facilitates selection of one or more of the offers on the list, adding offers to the list, and/or modifying offers on the list to produce a produce a list of merchant offers. For example, the transactional processing entity device may generate list of offers that, from compiled data, appears to be most attractive to the targeted market of the merchant. The merchant can use the list and select its offers therefrom, completely reject the list and create its own, or modify the list to produce the merchant offers. The transactional processing entity device stores the merchant offers and transitions back to the idle state. Note that this may be done for a plurality of merchants on a continual basis to maintain an updated list of offers per merchant.

With respect to a credit cardholder, the transactional processing entity device transitions from the idle state 70 to create a credit cardholder account state 86 in response to a new account request. In this state 86, the transactional processing entity device creates a credit cardholder account that includes identify of the credit cardholder, a pass word, level of service, and/or any other data needed to establish a secure account. Once the account is created, the transactional processing entity device transitions to the process credit cardholder profile state 88. This state may also be entered in response to a request to update the profile.

In state 88, the transactional processing entity device generates or updates the credit cardholder profile based on information from the credit cardholder device. The credit cardholder profile includes one or more of: account information, location preferences, product categories of interest, service categories of interest, and/or benefit type preferences. Once the credit cardholder profile is created or updated, the transactional processing entity device transitions to the process the credit cardholder's selections state 90.

In state 90, which may also be entered from the idle state 70 in response to an update selections request, the transactional processing entity device stores the selection or updating of offers, services, and/or features provided to the credit cardholder by the issuer device and/or the transactional processing entity device. This may be an iterative process where each selection made by the credit cardholder device is transmitted to the transactional processing entity device, which verifies the selected option (e.g., offer, feature, or service). If the selected option is verified, it is stored in the list of selected options for the cardholder. If the selected option is not verified (e.g., not on the list provided to the issuer, is incompatible with another selected option, etc.), the transactional processing entity device provides an error message to the credit cardholder device. This iterative processing continues until all of the selected options are verified and stored by the transactional processing entity device. In the alternative, the credit cardholder device may store the selection of the options and transmit them in one message to the transactional processing entity device. Upon successful recording the selected options for the card, the transactional processing entity device transitions back to the idle state 70.

Having stored the selected options for a credit card, the transactional processing entity device transitions to the process transaction state 92 in response to transaction for the credit card. In this state 92, the transactional processing entity device retrieves the selected options of the card (e.g., 1 bonus point for each dollar spent) and processes the transaction in accordance with the selected option. For example, if the transaction amount is $75 dollars, the credit cardholder's account is credited with 75 bonus points, which is stored by the transactional processing entity device and communicated to the issuer device and/or to the credit cardholder device.

After a transition is processed, the transactional processing entity transitions to the compile offer, feature, service and other usage data state 94. In this state, the transactional processing entity device compiles data regarding transactions it processes in light of available offers, features, and/or services, and/or selected offers, features, and/or services. Such data may include, but is not limited to, purchase amount, purchase date, purchase time, item(s) purchased, offers used, features used, services used, etc. Having compiled this data, the transactional processing entity device transitions to generate recommended offers, features, and/or services state 96.

In state 96, the transactional processing entity device interprets the data compiled in state 94 to determine the types of offers, features, and/or services that are most used, least used, used for specific products, used for amounts of purchase, spending habits of consumer types, spending habits of credit card status types, identifying cardholders as certain types of consumers, etc. From this interpretation, the transactional processing entity device determines, in accordance with a merchant's profile and its current offers, potential new offers, potential changes to existing offers, deletion of existing offers, suggesting offering a new product and/or service, changing a purchase price for a particular product or service, etc. The recommended offers are transmitted to merchant device, which may initiate an update request such that the transactional processing entity device transitions to state 84 to process selection of one or more recommended offers.

The transactional processing entity device may also generate recommended features for an issuer device. From the above described example interpretation, the transactional processing entity device may determine potential new features (e.g., X bonus points in internet sales, X-FI bonus points for in-store sales), potential changes to existing features, deletion of existing features, etc. The transactional processing entity device transmits the recommended offers to the issuer device, which may initiate an access request such that the transactional processing entity device transitions to state 74 to process selection of one or more recommended features.

The transactional processing entity device may also generate recommended services for its transactional processing entity. From the above described example interpretation, the transactional processing entity device may determine potential new services (e.g., roadside assistance), potential changes to existing services, deletion of existing services, etc.

In addition, the transactional processing entity device may determine recommended offers, services, and/or features for a given cardholder based on the cardholder's transactions, available offers, features, and/or services. In this instance, the transactional processing entity device would compose a message for the cardholder device indicating one or more new offers, features, and/or services, one or more modifications to make to an existing offer, feature, or service, and/or deletion of one or more existing offers, features, or services. The message is sent to the cardholder device, which may initiate an update causing the transactional processing entity device to transition to the process credit cardholder selections state 90 to process one or more of the recommended offers, features, and/or services.

FIGS. 17 and 18 are logic diagrams of embodiments of methods performed by the transactional processing entity device. In FIG. 17, the method begins at step 100 where the transactional processing entity device generates an offer data file for each of a plurality of merchant devices to produce a plurality of offer data files. An embodiment of generating an offer data file includes the transactional processing entity device processing a merchant profile for one of the plurality of merchant devices to identify at least one of market focus, product categories, service categories, targeted consumer demographics, and merchant information. The transactional processing entity device then provides a list of offer options to the one of the plurality of merchant devices in accordance with the merchant profile. The transactional processing entity device then receives selection of at least one offer from the list of offer options from the one of the plurality of merchant devices. The generation of an offer data file will be discussed in greater detail with reference to at least one of FIGS. 22-29.

The method continues at step 102 where the transactional processing entity device compiles an options data file for a group of credit cards based on at least one of the plurality of offer data files for one of a plurality of issuer devices. This step may further include the transactional processing entity device compiling the options data file to include at least one feature sponsored by an issuer associated with the one of the plurality of issuer devices and/or compiling the options data file to include at least one service sponsored by an transactional processing entity associated with the transactional processing entity device. The compiling of the options data file will be discussed in greater detail with reference to at least one of FIGS. 19-21.

The method continues at step 104 where the transactional processing entity device transmits the options data file to the one of the plurality of issuer devices. The method continues at step 106 where the transactional processing entity device receives, from the one of the plurality of issuer devices, at least one selection from the options data file to produce an options program file for the group of credit cards. The receiving of a selection from the options data file will be discussed in greater detail with reference to at least one of FIGS. 19-21.

The method continues at step 108 where the transactional processing entity device receives, from a card holder device associated with one of the group of credit cards, a selection of at least one option from the options program file to produce at least one selected option. The method continues at step 110 where the transactional processing entity device processes transactions of the one of the group of credit cards in accordance with the at least one selected option. The receiving a selection and processing transactions will be discussed in greater detail with reference to at least one of FIGS. 30-33.

The method of FIG. 18 begins at step 112 where the transactional processing entity device compiles data regarding at least one of: offer selections, offer usage, feature selections, feature usage, service selection, and service usage data from the processing transactions for a plurality of cards to produced compiled transaction data. The method continues at step 114 where the transactional processing entity device generates at least one of: recommended offers, recommended features, and recommended services based on the compiled transaction data.

Figure 19:
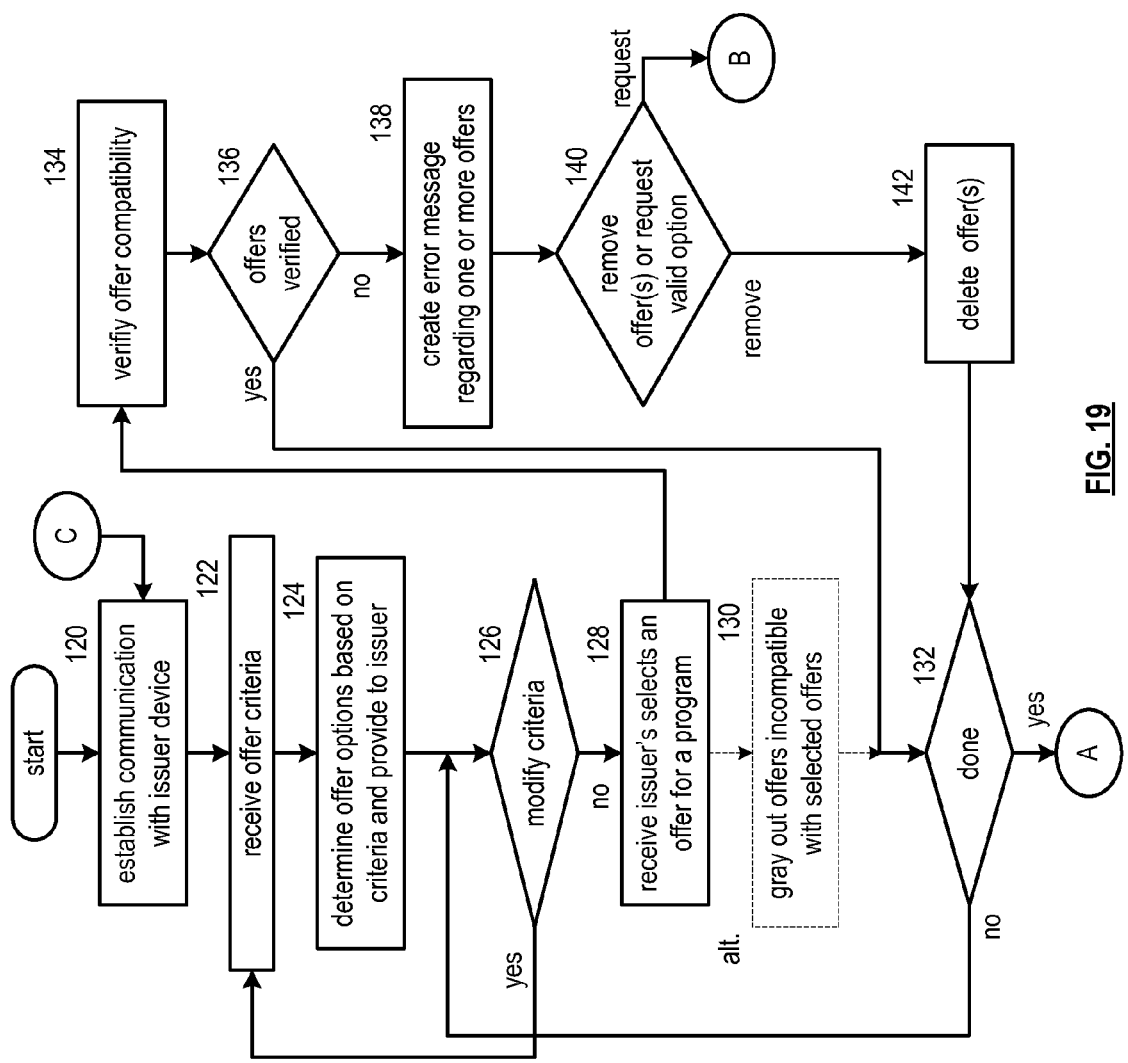
FIGS. 19-21 are logic diagrams of another embodiment of a method performed by the transactional processing entity device in accordance with the present invention.
Figure 20:
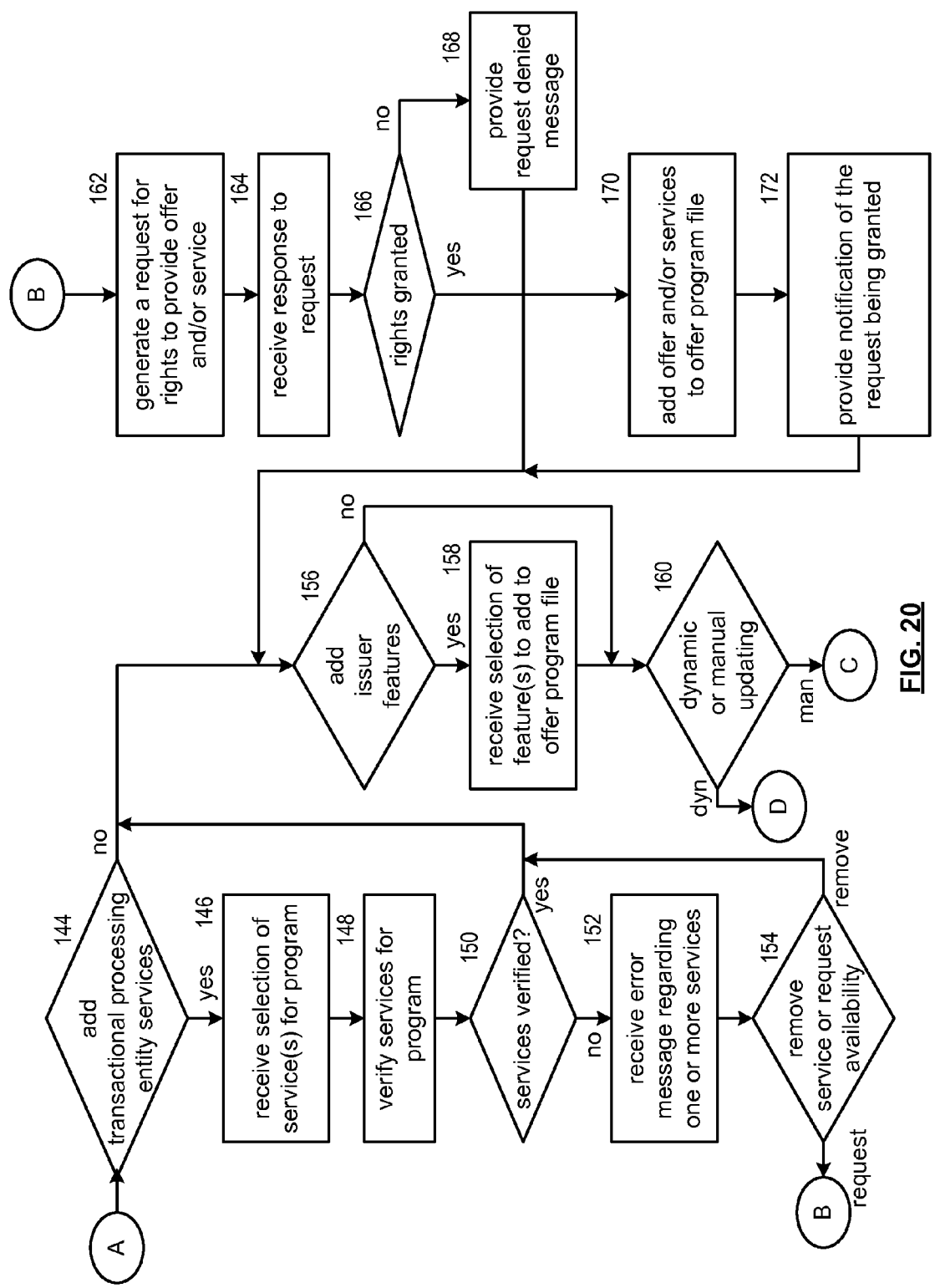
Figure 21:
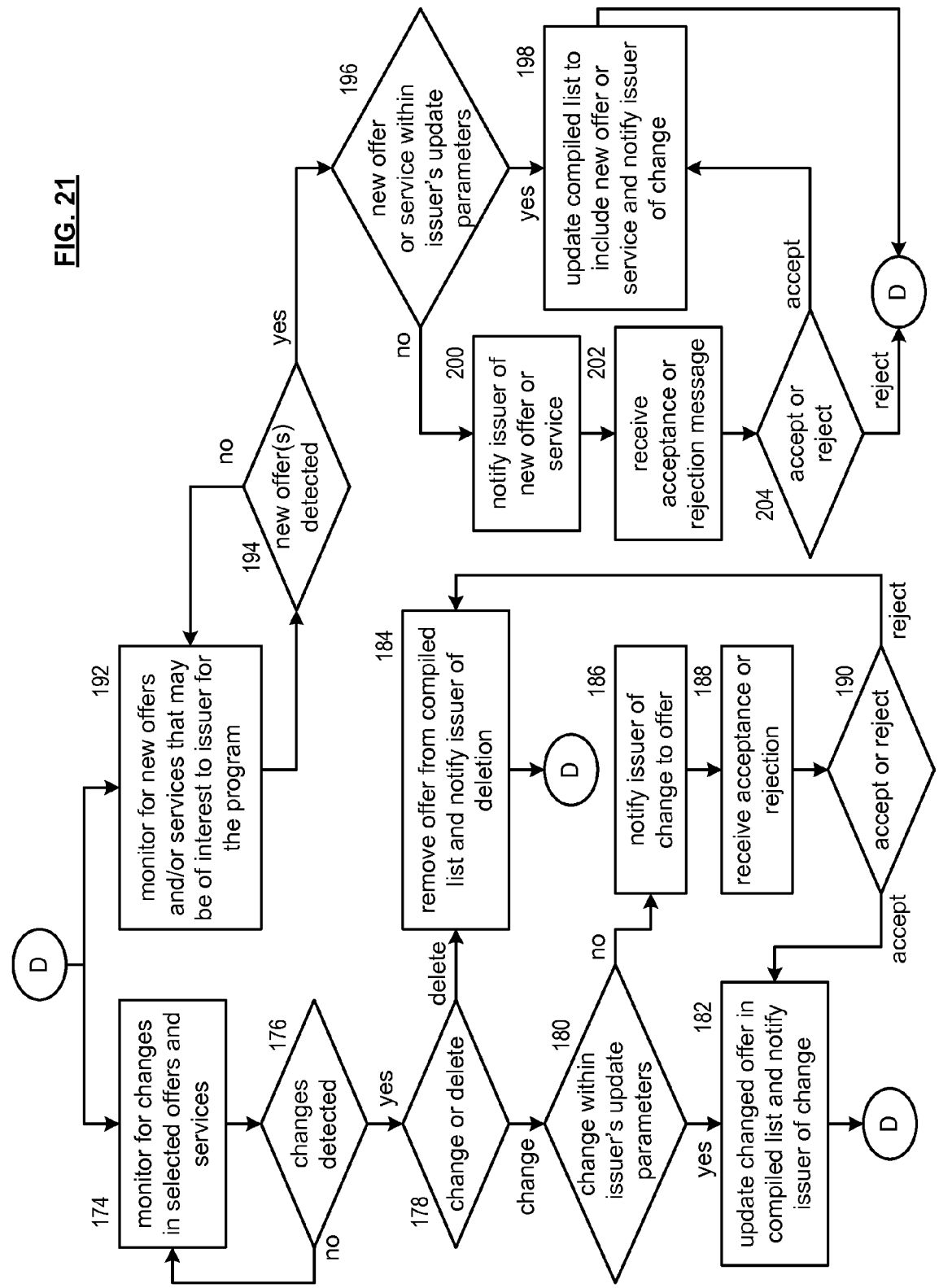

FIGS. 19-21 are logic diagrams of another embodiment of a method performed by the transactional processing entity device. The method begins in FIG. 19 at steps 120 where the transactional processing entity device establishes communication with an issuer device. This may be done via the proprietary network 16 using a conventional internet protocol (e.g., TCP/IP), a modification thereof, and/or a proprietary protocol. As such, the communication will involve packetizing, or generating frames, of the data being conveyed, where each packet or frame includes a header section and a data section.

The method continues at step 122 where the transactional processing entity device receives offer criteria from the issuer device. The offer criteria includes preferences of merchant offers, transactional processing entity services, and/or issuer features that the issuer is interested in for offering to one or more groups of credit cards. The offer criteria may further include preferences as how offers, services, and/or features are to be categorized. For example, the issuer may request all available offers, services, and/or features, may request offers from certain merchants, may request that offers be categorized based on specific merchants, based on product category, based on consumer type, based on credit card status, based on service category, based on merchant types (e.g., sports store, apparel store, etc.), based on location, based on offer types (e.g., rewards, discounts, free shipping, etc.), etc.

The method continues to step 124 where the transactional processing entity device generates offer options based on the issuer's offer criteria. The offer options include one or more merchant offers, one or more transactional processing entity services, and/or one or more issuer features. Once the transactional processing entity device has generated the offer options, it transmits them to the issuer device.

The method continues at step 126 where the transactional processing entity device determines whether the issuer device desires to change its offer criteria. For example, the issuer device may desire to change its offer criteria to reduce the number of offer options it receives, to better focus offer options for a particular cardholder type, etc. If the transactional processing entity device receives a request to change the offer criteria, the method repeats at step 122. If not, the method continues at step 128.

At step 128, the transactional processing entity device enters a loop that begins by receiving selection of an offer of the offer options from the issuer device to produce a selected offer. The method continues by performing a compatibility check of the selected offer with at least one of: a previously selected offer and a remaining offer of the offer options. This may be done at step 130 or via steps 134-142. In general, the compatibility check is to verify that a selected offer is compatible (e.g., permitted by a merchant, by the transactional processing entity) with another selected offer and/or to remove offers from the available offers based on a previously selected offer.

For steps 134-142, the transactional processing entity device verifies the selected offer's compatibility with previously selected offers at step 134. For example, if a merchant supports an offer for free shipping for purchases greater than $75 and a mutually exclusive offer for $10 off for purchases greater than $75, the transactional processing entity device verifies that both offers are not selected. The method continues at step 136 where the method branches based on whether the offer is verified. If yes, the method continues at step 132. If not, the method continues at step 138, where the transactional processing entity device generates an error message regarding the selected offer and transmits the message to the issuer device. The error message includes an indication that the selected offer is not compatible with one or more previously selected offers and may further includes request as to whether the issuer device would like to delete the selected offer or request validation of the offer.

The method continues at step 140 where the transactional processing entity device determines whether to remove the offer or request validation. If it is determined to remove the offer, the method continues to step 142 where the transactional processing entity device deletes the offer for the selected offer list. The method then continues at step 132. If, however, it is determined to request validation, the method continues at step 162 of FIG. 20, which will be subsequently described.

At step 132, the transactional processing entity device stores the selected offer to produce a stored offer when the compatibility check is favorable and determines whether to exit the loop, which may be done by detecting a designated stimulus. The designated stimulus may be a message received from the issuer device that it is done with the selection of offers, may be a calculation that the number of selected offers meets and/or exceeds a threshold, may be that all of the offer options are exhausted, etc. If the designated stimulus is not detected, the method repeats at step 126. If the designated stimulus is detected, the transactional processing entity device generates an offer program file for a group of cards based on one or more of the stored offers and the method then continues at step 144 of FIG. 20.

If the compatibility check is done with reference to remaining offer of the offer options, the method continues at step 130 where the transactional processing entity device determines whether the selected offer is compatible with the one or more previously selected offers. When it is not, the transactional processing entity device performs at least one of: prohibits selection of the selected offer (e.g., gray out incompatibly remaining available offers); rejects selection of the selected offer; and requests authorization to allow compatibility of the selected offer with the one or more previously selected offer.

At step 144 of FIG. 20, the transactional processing entity device determines whether the issuer device would like to add transactional processing entity services to the offer program file. If not, the method continues at step 156. If yes, the method continues at step 146 where the transactional processing entity device receives selection of one or more services. The method continues at step 148 where the transactional processing entity verifies the selection of the one or more services with previously selected services and/or with selected offers. If the selected one or more services are verified, they are added to the offer program file and the method continues at step 156 via step 150. If the one or more services are not verified, the method continues at step 152 via step 150.

At step 152, the transactional processing entity generates an error message indicating that the one or more services were not verified (i.e., not compatible with one or more previously selected services and/or offers). The message may further include a request for feedback as to whether issuer device would like to request that the select service be made available or to not add it to the program file. If the response is to not add it (or remove it), the selected service is not added to the offer program file and the method continues at step 156.

If the response is to request availability (e.g., remove the compatibility restriction), the method proceeds to step 162 where the transactional processing entity device generates a request for rights to provide the offer and/or service. The request regarding the offer is transmitted to the merchant device supporting the offer, while the request for service is provided to another device operated by the transactional processing entity or processed by the transactional processing entity device. The method then proceeds to step 164 where the transactional processing entity device receives (or generates) a response to the request.

The method proceeds to step 166 where, if the rights are granted, the method branches to step 170 and, if the rights are not granted, the method branches to step 168. At step 168, the transactional processing entity device generates a message indicating that the request was denied and transmits it to the issuer device. The method then continues at step 156. At step 170, the transactional processing entity device adds the offer and/or service to the offer program file. The method continues at step 172 where the transactional processing entity device provides notification of the request being granted and that the offer or service is added to the program file.

At step 156, the transactional processing entity device determines whether the issuer device desires to add issuer features to the offer program list. If not, the method continues at step 160. If yes, the method continues at step 158 where the transactional processing entity device receives selection of one or more features to add to the offer program file. After adding the one or more features to the offer program list, the method continues at step 160 where the transactional processing entity device determines whether the issuer device has subscribed to automatic updating of the offer program file or to manual updating of the offer program file. For manual updating the method reverts to step 120 of FIG. 19 and the above described process is followed for updating (e.g., added new offers, features, and/or services to the program file, deleting offers. features, and/or services, and/or modifying offers, features, and/or services).

For automatic updating, the method continues at step 174 and step 192 of FIG. 21. At step 174 the transactional processing entity device monitors for changes to offers, services, and/or features of the offer program file. When a change is detected, the method branches from step 176 to step 178 where the transactional processing entity device determines whether the change is deletion of the offer, feature, and/or service or a modification of the offer, feature, and/or service. If the change is deletion, the method continues at step 184 where the transactional processing entity device removes the deleted offer, feature, and/or service from the offer program file and provides notification thereof to the issuer device.

If the change is a modification, the method continues at step 180 where the transactional processing entity device determines whether the change is within the issuer's update parameters for automatic updating. Such parameters indicate the conditions under which changes to offers can be automatically changed in the offer program file and which changes should be brought to the attention of the issuer device such that the issuer device may provide the response as to whether the change is to be accepted or the changed offer, service, or feature is to be deleted. For example, if the change affects valid dates for a coupon type offer, then such changes may be automatically updated. As another example, if the change affects the amount of a cash back program, the issuer may want to decide whether to accept such a change.

If the change is within the issuer's update parameters, the method continues at step 182 where the transactional processing entity updates the offer program file in accordance with the change. If the change is not within the issuer's update parameters, the method continues at step 186 where the transactional processing entity device provides notice of the change to the issuer device. The method continues at step 188 where the transactional processing entity device receives an acceptance or rejection message from the issuer device. If the change is accepted, the method branches through step 190 to step 182. If the change is rejected, the method branches through step 190 to step 184.

At step 192, the transactional processing entity device monitors for new offers and/or new services that may be of interest to the issuer device. Such a determination may be made based on the issuer's offer criteria. If a new offer or service is detected, the method continues through step 194 to step 196 where the transactional processing entity device determines whether the new offer or new service is within the issuer's update parameters. In this instance, the issuer update parameters indicate the conditions under which new offers and/or new service can be automatically added in the offer program file and which new offers and/or new services should be brought to the attention of the issuer device such that the issuer device may provide the response as to whether the new offer and/or new service is to be added to the offer program file.

If the new offer and/or new service is within the issuer's update parameters, the method continues at step 198 where the transactional processing entity device adds the new offer and/or new service to the offer program file and provides notification thereof to the issuer device. If the new offer and/or new service is not within the issuer's update parameters, the method continues at step 200 where the transactional processing entity device provides notice of the new offer and/or service to the issuer device. The method continues at step 202 where the transactional processing entity device receives a message from the issuer device indicating acceptance or rejection of the new offer and/or service. If accepted, the method continues through step 204 to step 198.

FIG. 22 is a logic diagram of another embodiment of a method performed by the transactional processing entity device that begins at step 210 where the transactional processing entity device establishes communication with a merchant device. This may be done via the proprietary network 16 using a conventional internet protocol (e.g., TCP/IP), a modification thereof, and/or a proprietary protocol. As such, the communication will involve packetizing, or generating frames, of the data being conveyed, where each packet or frame includes a header section and a data section.

The method continues at step 212 where the transactional processing entity device processes a merchant profile by creating and/or updating the profile. The merchant profile includes information to identify at least one of market focus, product categories, service categories, targeted consumer demographics, and merchant information for a merchant associated with one of a plurality of merchant devices. An example of a merchant profile 222 is shown in FIG. 23 that includes a merchant identification section (e.g., name, address, etc.), a market focus section (e.g., local [e.g., city, county], regional [e.g., geographic area, state], national, international), product categories (e.g., apparel, shoes, books, music, movies, computers, software, electronics, sports, fitness, flower, general retail, etc.), service categories (e.g., food service, beverage service, auto repair, computer repair, consulting, insurance, etc.), and target consumer demographics (e.g., male, female, age range, sport specific participation [e.g., golf, tennis], specific spending habits [e.g., spends X per month, uses credit card for travel, travels M times per year, etc], purchasing preferences [e.g., internet, specialty stores, general retail stores], etc.). In this example, the merchant may check one or more boxes per relevant category to indicate its market, business, and consumer focus.

Returning to the method of FIG. 22, the method continues at step 214 where the transactional processing entity device accesses the information of the merchant profile (e.g., the market, business, and consumer focus data). The method continues with the transactional processing entity device entering a loop that includes steps 216-220. At step 216, the transactional processing entity device determines whether the merchant device desires to create a new for inclusion in an offer data file. If yes, the method continues at step 230 of FIG. 24 to create and store an offer, which will be subsequently described.

The method continues at step 218 where the transactional processing entity device determines whether the merchant device desires to delete or modify an existing offer in the offer data file. If yes, the method continues at step 260 of FIG. 27 to modify and store an offer, which will be subsequently discussed. In not, the method continues at step 220 where the transactional processing entity device determines whether to exit the loop based on detection of a designated stimulus and produces, in accordance with the merchant profile, the offer data file that includes at least one of: one or more stored offers and one or more modified offers.

Figure 24:
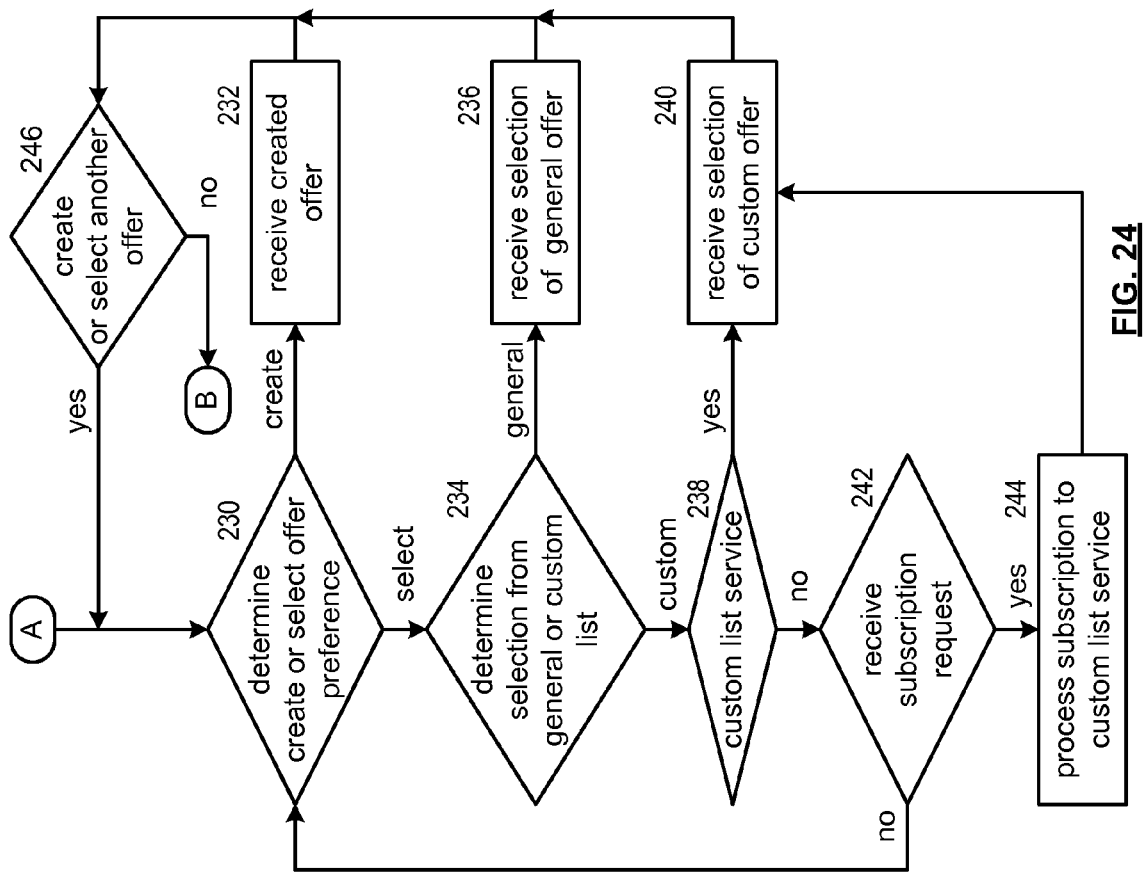
FIG. 24 is a logic diagram of another embodiment of a method performed by the transactional processing entity device in accordance with the present invention.

The method of FIG. 24 begins at step 230 where the transactional processing entity device determines whether the merchant device desires to create an offer or to select an offer from a list of offers. An example of a list of offers 250 is shown in FIG. 25. The list 250 is generated by the transactional processing entity device based on the merchant profile. For example, for a given merchant, the transactional processing entity device may determine certain generic offers (e.g., 2% off all items, free shipping with purchases greater than $50, etc.), location offers (e.g., buy 10 of X get 1 free in all CA and TX stores), consumer specific offers (e.g., 5% off on men's shoes), and/or issuer offers (e.g., 1 bonus point per $1 spent for using Bank A card, exclusive shopping for using Bank B card) are of interest based on the merchant's business focus, market focus, and/or customer focus.

Returning to the method of FIG. 24, if the offer is to be created, the method continues at step 232 where the transactional processing entity device receives offer parameters from the merchant devices for inclusion in the list of offers. With reference to the example of FIG. 25, the merchant device provides offer parameters of 10% off of all merchandize purchased during Dec. 1, 2007 through Dec. 8, 2007. The transactional processing entity device adds the offer to the list as shown.

If, at step 230, it is determined that the merchant device desires to select an offer from the list, the method continues at step 234 where the transactional processing entity device determines whether the merchant device has general (e.g., the offer list is generic to merchants in a similar line of business as the present merchant) or custom list (e.g., offers are determined specifically for the given merchant based on profile and/or collected transactional data) services. If the merchant device has general list services, the method continues at step 236 where the transactional processing entity device receives a selection of one or more of the offers on the list (including the merchant device created offers).

If it is determined that the merchant device desires to select from a custom list, the transactional processing entity device determines whether the merchant device has custom list services. If not, the method continues at step 242 where the transactional processing entity device determines whether the merchant device desires to sign up for the custom list service. If not, the method repeats at step 230. If yes, the method continues at step 244 where the merchant device is granted custom list service and the method continues at step 240.

At step 240, the transactional processing entity device receives selection of a custom offer. An example of a custom offer is shown in FIG. 25 as the free product Y with purchase of product Z. In another embodiment, the list of offers is a custom list of offers generated specifically for the merchant device.

The method loops at step 246 depending on whether another offer is to be selected. When the loop is complete, the transactional processing entity device creates the list of offers and creates the Merchant's offers data file. An example of a merchant offer data file 252 is shown in FIG. 26 that includes selections of one or more of the offers of the list of offers 250.

When, at step 218 of FIG. 22, an offer is to be changed, the method continues at step 260 of FIG. 27 where the transactional processing entity device provides the list of offers and/or the merchant offers data file. The method continues at step 262 where the transactional processing entity device receives a highlighted offer such that it can identify an offer of the offer data file. The method continues at step 264 where the transactional processing entity device determines whether change is for a modification or a deletion. If the change is to delete the offer, the method continues at step 266 where the transactional processing entity device deletes the offer from the offer data file.

If the request is to modify the offer, the method continues at step 268 where the transactional processing entity device changes one or more parameters of the offer in accordance with the received instruction. FIGS. 28 and 29 illustrate an example of modifying an offer in the offer data file 252-1 and 252-2. FIG. 28 shows a highlighted offer. FIG. 29 shows the change made to the offer.

FIG. 30 is a logic diagram of another embodiment of a method performed by the transactional processing entity device that begins by establishing a communication with a credit cardholder device at step 270. Such a communication may be done via the proprietary network 16 using a conventional internet protocol (e.g., TCP/IP), a modification thereof, and/or a proprietary protocol. In an embodiment, the communication involves packetizing, or generating frames, of the data being conveyed, where each packet or frame includes a header section and a data section.

The method continues at step 272 where the transactional processing entity device determines whether the cardholder device is associated with a credit cardholder that has an account or desires to establish one. If the cardholder is new, the method continues at step 273 where the transactional processing entity device creates a credit cardholder profile to include account information, location preferences, product categories of interest; service categories of interest, and/or benefit type preferences. An example of a credit cardholder profile is shown in FIG. 32.

As shown, the profile 300 includes account information (e.g., cardholder's name, sex, age, account number, account type, issuer bank, etc.), location preferences (e.g., within 20 miles of home, within home county, within home state, no preference, while traveling to a particular location such that cardholder can receiver offers related to the site that he/she is traveling to, etc.), product categories of interest (e.g., apparel, shoes, books, music, movies, computers, software, electronics, sports, fitness, flowers, general retail, etc.), service categories of interest (e.g., food service, beverage service, auto repair, computer repair, consulting, insurance, etc.), and benefit type preferences (e.g., cash back, free gifts, travel points, award points, discounts, sales, services, status, etc.).

Returning to the method of FIG. 30, if the cardholder has an account, the method continues at step 274 where the transactional processing entity device retrieves the credit cardholder's profile from a storage location (e.g., in database 14). The method continues at step 276 where the transactional processing entity device determines whether, during communication with the credit cardholder device, it receives a request to change the credit cardholder's profile. If yes, the method continues at step 277 where the transactional processing entity device updates the profile based on inputs from the credit cardholder device. As such, in steps 272-277, the transactional processing entity is processing a card holder's profile.

The transactional processing entity device generates a list of available options (e.g., offers, services, and/or features) from an options data file (which was created by the issuer device) in accordance with the card holder profile and provides the list to credit cardholder device at step 278. The method continues at step 280 where the transactional processing entity device enters a loop that includes steps 280-282. At step 280, the transactional processing entity device receives a selection message indicating selection of a check box associated with an offer, service, and/or feature. The method continues at step 282 where the selection of the offer, feature, and/or service is verified. Once verified, the selected offer, feature, and/or service is stored. The method continues within the loop of steps 280-282, which may further include modifying an existing option when a modify message is received to produce a modified option, until a designated stimulus is detected (e.g., all options exhausted, have selected a designated number of options, message from credit cardholder device, etc.).

Upon exiting the loop, the method continues at step 284 where the transactional processing entity device affiliates verified selected offers, features, and/or services with the credit cardholder's account to produce a card holder selection file that includes at least one of: one or more stored options and one or more modified options. The transactional processing entity device utilizes the credit cardholder selection file to process transactions of the credit card such that the selected offers, services, and/or features are applied as further described in FIG. 31.

FIG. 31 is a logic diagram of another embodiment of a method that begins with the transactional processing entity device processing transactions of the credit card in accordance with the selected offers, features, and/or services of the selected list at step 286. The method continues at step 288 where the transactional processing entity device compiles offer, feature, service, and/or use data for transactions of the credit card and other credit cards. The method continues at step 290 where the transactional processing entity device generates recommended offers, features, and/or services based on the data for the credit cardholder.

Figure 33:
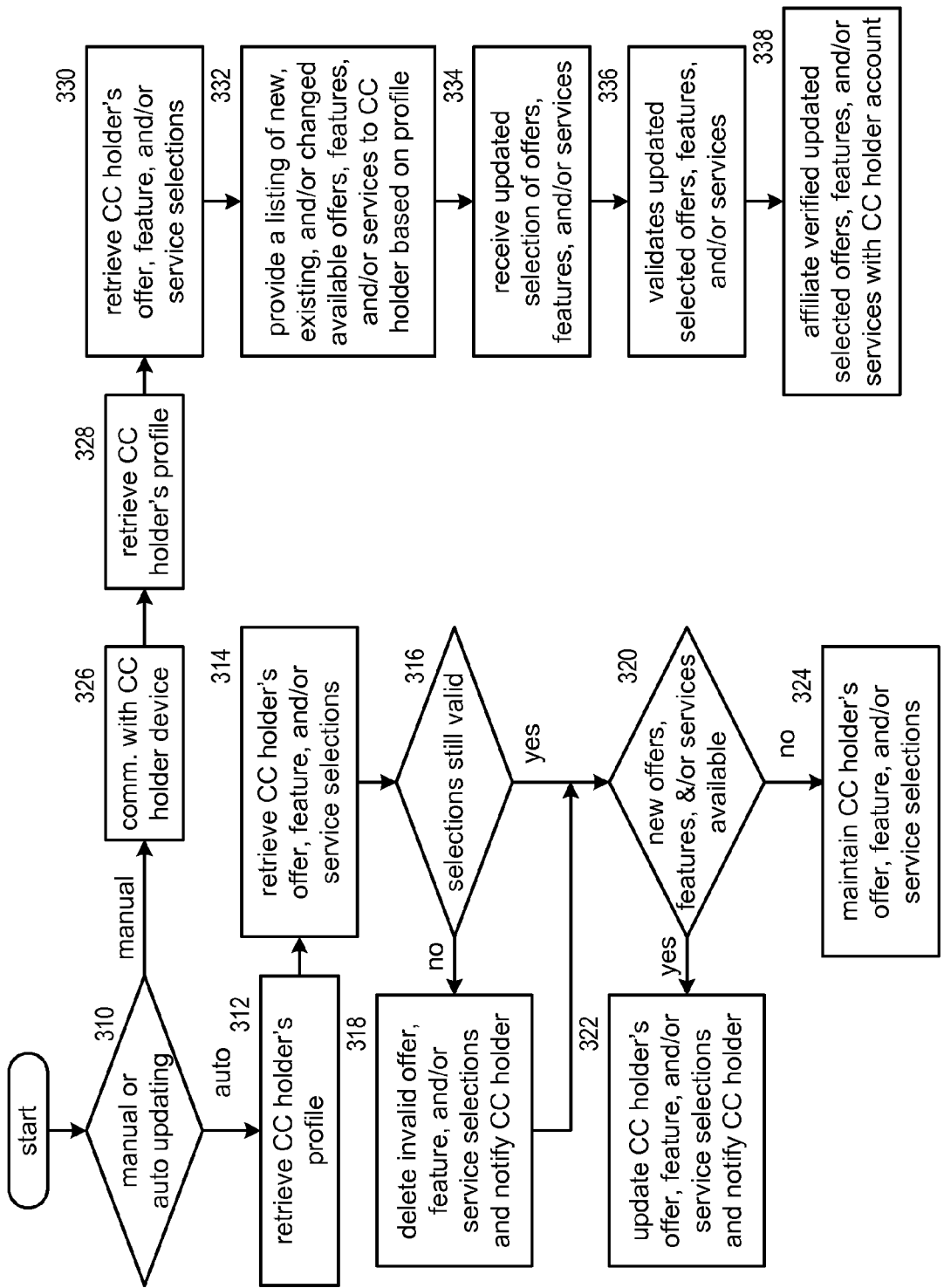
FIG. 33 is a logic diagram of another embodiment of a method performed by the transactional processing entity device in accordance with the present invention.

FIG. 33 is a logic diagram of another embodiment of updating the selection file of a credit cardholder that begins with the transactional processing entity device determining whether the credit cardholder has automatic or manual updating services at step 310. When the credit cardholder has automatic updating services, the method continues at step 312 where the transactional processing entity device retrieves the card holder profile and the card holder selection file. The method continues at step 314 where the transactional processing entity device determines whether an option of the card holder selection file is valid (e.g., has not expired, has not changed making it unavailable to the credit cardholder, etc.). If the option is not valid, the method continues at step 318 where the transactional processing entity device deletes the invalid offer, feature, and/or service from the card holder selection file.

The method continues at step 320 where the transactional processing entity device determines, based on the card holder profile, whether a new option is available. If yes, the method continues at step 322 where the transactional processing entity device updates the card holder selection file with the new option. If not, the method continues at step 324 where the selection file is maintained.

If the credit cardholder has manual updating services, the method continues at step 326 where the transactional processing entity device establishes communication with the credit cardholder device (which may be done on the transactional processing entity device's own initiative or in response to a request from the credit cardholder device). The method continues with the transactional processing entity device retrieving the card holder profile at step 328 and retrieving the card holder selection file at step 330. The method continues at step 332 where the transactional processing entity device generates a list of at least one of: new options, existing options, and changed options in accordance with the card holder profile and provides it to the credit cardholder device.

The method continues at step 334 where the transactional processing entity device receives an update message that includes instructions to update the card holder selection file with at least one of: one or more of the new options, with a modification to one or more of the existing options, and one or more of the changed options. The method continues at step 336 where the transactional processing entity device validates the update message. The method continues at step 338 where the transactional processing entity device updates the card holder selection file in accordance with the update message when the update message is validated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method, comprising:
   communicating with merchant devices to collect merchant offers;
   communicating, via a transaction entity device, with issuer devices to collect issuer criteria including criteria of a first issuer;
   providing, to a first issuer device of the first issuer, a list of options in accordance with the criteria of the first issuer, wherein the list of options is based on at least one of the merchant offers;
   receiving, from the first issuer device, at least one issuer selection from the list of options to provide a list of available offers for a group of cards including a first card;
   providing, to a first cardholder device associated with the first card, the list of available offers;
   receiving, from the first cardholder device, at least one cardholder selection from the list of available offers; and
   processing, via the transaction entity device, transactions for the group of cards, including processing transactions for the first card in accordance with the at least one cardholder selection.

2. The method of claim 1, further comprising organizing the merchant offers based on a merchant that supports an offer.

3. The method of claim 1, further comprising organizing the merchant offers based on a type of offer.

4. The method of claim 1, further comprising periodically communicating with the merchant devices to update the merchant offers.

5. The method of claim 1, wherein the issuer criteria of a second issuer excludes any offers supported by a merchant specified by the second issuer.

6. The method of claim 1, further comprising selecting one or more transactional processing entity services to provide to the first issuer device based on the criteria of the first issuer.

7. The method of claim 1, further comprising receiving, from the first issuer device, an identity of the first issuer and card information regarding the group of cards.

8. A system, comprising:
   at least one processor; and
   memory storing instructions configured to instruct the at least one processor to:
     communicate with merchant devices to collect merchant offers;
     communicate with issuer devices to collect issuer criteria including criteria of a first issuer;
     provide, to a first issuer device of the first issuer, a list of options in accordance with the criteria of the first issuer, wherein the list of options is based on at least one of the merchant offers;
     receive, from the first issuer device, at least one issuer selection from the list of options to provide a list of available offers for a group of cards including a first card;

provide, to a first cardholder device associated with the first card, the list of available offers;

receive, from the first cardholder device, at least one cardholder selection from the list of available offers; and process transactions for the group of cards, including processing transactions for the first card in accordance with the at least one cardholder selection.

9. The system of claim 8, wherein the instructions further instruct the at least one processor to organize the merchant offers based on a merchant that supports an offer.

10. The system of claim 8, wherein the instructions further instruct the at least one processor to organize the merchant offers based on a type of offer.

11. The system of claim 8, wherein the instructions further instruct the at least one processor to periodically communicate with the merchant devices to update the merchant offers.

12. The system of claim 8, wherein the issuer criteria of a second issuer excludes any offers supported by a merchant specified by the second issuer.

13. The system of claim 8, wherein the instructions further instruct the at least one processor to select one or more transactional processing entity services to provide to the first issuer device based on the criteria of the first issuer.

14. The system of claim 8, wherein the instructions further instruct the at least one processor to receive, from the first issuer device, an identity of the first issuer and card information regarding the group of cards.

15. A non-transitory computer-readable storage medium storing computer-readable instructions, which when executed, cause a system to:

communicate with merchant devices to collect merchant offers;

communicate with issuer devices to collect issuer criteria including criteria of a first issuer;

provide, to a first issuer device of the first issuer, a list of options in accordance with the criteria of the first issuer, wherein the list of options is based on at least one of the merchant offers;

receive, from the first issuer device, at least one issuer selection from the list of options to provide a list of available offers for a group of cards including a first card;

provide, via a transaction entity device, to a first cardholder device associated with the first card, the list of available offers;

receive, from the first cardholder device, at least one cardholder selection from the list of available offers; and process transactions for the group of cards, including processing transactions for the first card in accordance with the at least one cardholder selection.

16. The storage medium of claim 15, wherein the instructions further cause the system to organize the merchant offers based on a merchant that supports an offer.

17. The storage medium of claim 15, wherein the instructions further cause the system to organize the merchant offers based on a type of offer.

18. The storage medium of claim 15, wherein the instructions further cause the system to periodically communicate with the merchant devices to update the merchant offers.

19. The storage medium of claim 15, wherein the instructions further cause the system to receive, from the first issuer device, an identity of the first issuer and card information regarding the group of cards.

20. The storage medium of claim 15, wherein the issuer criteria of a second issuer excludes any offers supported by a merchant specified by the second issuer.

* * * * *